US012506690B2

(12) United States Patent
Ying et al.

(10) Patent No.: US 12,506,690 B2
(45) Date of Patent: *Dec. 23, 2025

(54) CONNECTIVITY BETWEEN LOGICAL ROUTER PODS

(71) Applicant: VMware LLC, Palo Alto, CA (US)

(72) Inventors: Yu Ying, Cupertino, CA (US); Yong Wang, San Jose, CA (US); Pankaj Gupta, Fremont, CA (US); Sreeram Kumar Ravinoothala, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 18/225,559

(22) Filed: Jul. 24, 2023

(65) Prior Publication Data

US 2025/0039088 A1 Jan. 30, 2025

(51) Int. Cl.
H04L 45/76 (2022.01)
H04L 45/586 (2022.01)
H04L 47/125 (2022.01)

(52) U.S. Cl.
CPC ............ H04L 45/76 (2022.05); H04L 45/586 (2013.01); H04L 47/125 (2013.01)

(58) Field of Classification Search
None
See application file for complete search history.

(56) References Cited

U.S. PATENT DOCUMENTS

| 6,490,679 B1 * | 12/2002 | Tumblin ................. G06F 21/33 726/1 |
| 7,987,356 B2 * | 7/2011 | Buer ..................... H04L 9/3242 713/165 |
| 9,979,602 B1 | 5/2018 | Chinnakannan et al. |
| 10,672,044 B2 | 6/2020 | Inbaraj et al. |
| 10,708,082 B1 | 7/2020 | Bakiaraj et al. |
| 10,855,531 B2 | 12/2020 | Vaidya et al. |
| 10,944,691 B1 * | 3/2021 | Raut ....................... H04L 45/64 |
| 10,949,313 B2 | 3/2021 | Bernat et al. |
| 10,965,752 B1 | 3/2021 | Smith |

(Continued)

FOREIGN PATENT DOCUMENTS

CN 114143258 A 3/2022

OTHER PUBLICATIONS

Non-Published Commonly Owned U.S. Appl. No. 18/225,027, filed Jul. 21, 2023, 27 pages, VMware, Inc.

(Continued)

Primary Examiner — Ranodhi Serrao
(74) Attorney, Agent, or Firm — Quarles & Brady LLP

(57) ABSTRACT

Some embodiments provide a method for implementing a logical router of a logical network at a first Pod executing on a first node of a Kubernetes cluster to implement data message forwarding for the logical router. The method receives a data message for processing by the logical router. The method determines that the data message requires layer 7 (L7) service processing at the logical router. The method selects a second Pod from multiple Pods that perform L7 service for the logical router. Each of the Pods executes on a different node of the cluster. The method forwards the data message to the second Pod via a layer 2 (L2) construct that connects the first and second Pods.

24 Claims, 14 Drawing Sheets

(56) References Cited

U.S. PATENT DOCUMENTS

| | | | |
|---|---|---|---|
| 11,050,620 B2 | 6/2021 | Reed et al. | |
| 11,074,091 B1 | 7/2021 | Nayakbomman et al. | |
| 11,159,366 B1 | 10/2021 | Gawade et al. | |
| 11,201,955 B1 | 12/2021 | Sachdeva et al. | |
| 11,316,822 B1 | 4/2022 | Gawade et al. | |
| 11,329,918 B2 | 5/2022 | Sarva et al. | |
| 2005/0232428 A1* | 10/2005 | Little | H04W 12/041 380/277 |
| 2005/0251680 A1* | 11/2005 | Brown | H04W 12/069 713/171 |
| 2006/0117177 A1* | 6/2006 | Buer | H04L 9/0897 713/155 |
| 2010/0104102 A1* | 4/2010 | Brown | H04L 9/3215 380/277 |
| 2012/0131655 A1* | 5/2012 | Bender | H04L 9/3228 726/6 |
| 2013/0152208 A1* | 6/2013 | King | H04W 12/06 726/26 |
| 2017/0054591 A1 | 2/2017 | Hyoudou et al. | |
| 2017/0085486 A1 | 3/2017 | Chung et al. | |
| 2017/0126500 A1 | 5/2017 | Eggen et al. | |
| 2018/0367605 A1 | 12/2018 | Maity et al. | |
| 2019/0068439 A1 | 2/2019 | Inbaraj et al. | |
| 2019/0081905 A1 | 3/2019 | Inbaraj et al. | |
| 2019/0087297 A1 | 3/2019 | Inbaraj et al. | |
| 2019/0089483 A1 | 3/2019 | Rathineswaran et al. | |
| 2019/0166032 A1 | 5/2019 | Inbaraj et al. | |
| 2019/0384376 A1 | 12/2019 | Mathews et al. | |
| 2020/0073692 A1* | 3/2020 | Rao | H04L 12/4633 |
| 2020/0099610 A1 | 3/2020 | Heron et al. | |
| 2020/0112487 A1 | 4/2020 | Namdar et al. | |
| 2020/0204481 A1 | 6/2020 | Heron et al. | |
| 2020/0204492 A1 | 6/2020 | Sarva et al. | |
| 2020/0252458 A1 | 8/2020 | Bhatia et al. | |
| 2020/0403872 A1 | 12/2020 | Shivashankara et al. | |
| 2021/0019194 A1 | 1/2021 | Bahl et al. | |
| 2021/0067484 A1 | 3/2021 | Parab et al. | |
| 2021/0084103 A1 | 3/2021 | Smith | |
| 2021/0126871 A1 | 4/2021 | Bonas | |
| 2021/0185125 A1 | 6/2021 | Smith | |
| 2021/0271523 A1 | 9/2021 | Parthasarathy et al. | |
| 2021/0303365 A1 | 9/2021 | Li et al. | |
| 2021/0328858 A1 | 10/2021 | Asveren et al. | |
| 2021/0365290 A1 | 11/2021 | Zhang et al. | |
| 2022/0038310 A1* | 2/2022 | Boutros | H04L 67/1004 |
| 2022/0038311 A1* | 2/2022 | Shen | H04L 63/0263 |
| 2022/0038368 A1* | 2/2022 | Shen | H04L 45/02 |
| 2022/0038501 A1* | 2/2022 | Shen | G06F 9/5077 |
| 2022/0131852 A1 | 4/2022 | Sharma et al. | |
| 2022/0200957 A1 | 6/2022 | Prabagaran et al. | |
| 2023/0028837 A1 | 1/2023 | Wang et al. | |
| 2023/0028922 A1 | 1/2023 | Wang et al. | |
| 2025/0007783 A1* | 1/2025 | Smith | H04L 41/0806 |

OTHER PUBLICATIONS

Non-Published Commonly Owned U.S. Appl. No. 18/225,554, filed Jul. 24, 2023, 49 pages, VMware, Inc.

Tran, M. et al., Network Performance Benchmarking for Containerized Infrastructure in NFV Environment, 2022 4th International Workshop on Performance Evaluation of Next Generation Virtualized Environments and Software-Defined Networks, 2022, pp. 115-120.

European Patent Office, Extended Search Report, Application No. 24190438.2, Nov. 27, 2024, 14 pages.

* cited by examiner

CONNECTIVITY BETWEEN LOGICAL ROUTER PODS

BACKGROUND

Today, Kubernetes is the de-facto orchestration platform that automates the process of deploying and managing micro-service-based cloud-native applications at massive scale. However, unique challenges exist with how networking functions can leverage the benefits offered by Kubernetes, such as better scalability, resiliency, and elasticity. These unique challenges exist partly due to network function virtualization (NFV) data plane functions differing greatly from web and database applications where Kubernetes has been proven to be mostly successful.

Edge node architecture is often based on a monolithic appliance model. For example, some edge nodes use a datapath built on Data Plane Development Kit (DPDK), which is a widely used kernel-bypassing networking technology designed to maximize networking performance. DPDK moves control of the networking hardware out of the kernel and into the application, thus removing the overhead of context switches and kernel-user-space crossing, along with other optimizations. The current multi-tenancy high performance edge appliances based on this architecture work well, in particular for layer 4 (L4) services that are tightly integrated with the DPDK poll mode driver (PMD) threads. However, with more networking and security functions moving to the application layer (L5-L7), this architecture has shown its limitations.

BRIEF SUMMARY

Some embodiments of the invention provide a system for implementing one or more logical routers in a container cluster (e.g., a Kubernetes cluster) having multiple nodes that each execute a set of Pods. In some embodiments, each of a set of the logical routers of a logical network performs layer 7 services (e.g., TLS proxy, load balancing service) on at least a subset of the logical network data traffic that the logical router processes. Each of these logical routers has its functionality divided across multiple Pods. Specifically, some embodiments deploy a first Pod that performs data forwarding operations (e.g., layer 2-layer 4 operations) for multiple logical routers as well as one or more separate Pods for each of these logical routers to perform services (e.g., layer 7 service operations) for its respective logical router.

In some embodiments, the cluster controllers (e.g., executing on a master node of the Kubernetes cluster) assign the first Pod (that performs data forwarding operations for multiple logical routers, herein referred to as the "L4 Pod") to a specific first node of the cluster and then distributes the other logical router pods (the service Pods, herein referred to as "L7 Pods") across a set of worker nodes (possibly including the first node). Some embodiments affinitize the L4 Pod to the first node (i.e., so that this Pod is pinned to this node) while the L7 Pods may be moved between the nodes based on resource usage or other factors.

The L4 pod, in some embodiments, executes a data plane development kit (DPDK) datapath that uses a set of run-to-completion threads for processing data messages sent to the logical router as well as a set of control threads for handling control plane operations. Each run-to-completion thread, in some embodiments, is assigned to a different core of a set of cores of a computing device on which the first Pod executes, while the set of control threads are scheduled between the cores of the computing device. The set of data message processing operations performed by the L4 pod (e.g., by the datapath) includes layer 2-layer 4 (L2-L4) operations, such as L2/L3 lookups, tunnel termination/encapsulation, L2-L4 firewall processing, packet updating, and byte counters. That is, the L4 Pod performs the actual routing for all of the logical routers, with any L7 service processing offloaded to the L7 Pods.

As mentioned, in some embodiments, the logical routers belong to a logical network. This logical network connects network endpoints (e.g., various applications), which may also execute on Pods of the cluster, to each other as well as to external endpoints. In some embodiments, the logical network includes logical switches that logically connect directly to the network endpoints, a first tier of of logical routers for interfacing with external networks, and a second tier of logical routers interposed between the first-tier logical router and logical switches and which provide administrator-configured L7 services for data traffic entering and exiting the logical switches. The first-tier logical routers may also provide administrator-configured L7 services for data traffic entering and exiting the logical network, in some embodiments. In some embodiments, logical routers of either tier are implemented by the L4 and L7 Pods. Logical routers without any L7 services defined are implemented only by the L4 Pod.

Each logical router is configured (e.g., by a network administrator) to perform a respective set of services on data messages handled by that logical router, and the set of service operations performed by the L7 Pods for these logical routers includes the respective set of services configured for the logical router. These services, in some embodiments, include L5-L7 services, such as L7 firewall services, transport layer security (TLS) services (e.g., TLS proxy), L7 load balancing services, uniform resource locator (URL) filtering, and domain name service (DNS) forwarding. In some embodiments, if multiple such services are configured for a given logical router, each of these services is implemented by a separate L7 Pod.

In some embodiments, the L4 Pod that implements logical forwarding processing for a set of logical routers is also responsible for configuring the L7 Pods for those logical routers. The L4 Pod receives configuration data for a given logical router from a network management system that defines the logical network, provides Pod definition data to a cluster controller (e.g., a Kubernetes API server) to create an L7 Pod, and then communicates directly with the L7 Pod to further configure that Pod. Specifically, in some embodiments, the L4 Pod provides to the L7 Pod (i) networking information to enable a connection for data messages between the L4 and L7 Pods and (ii) configuration data that defines the L7 services for the L7 Pod to perform on the data messages sent from the L4 Pod to the L7 Pod (i.e., via said connection enabled by the networking information).

To perform these operations, the L4 Pod stores a configuration database (e.g., NestDB) to which the network management system provides the configuration data for the logical routers. In addition, the L4 Pod executes (i) a datapath, (ii) a network management system agent, and (iii) a Pod configuration agent. The network management system agent, in some embodiments, reads logical forwarding configuration data for each of the logical routers from the configuration database and uses this logical forwarding configuration data to configure the datapath to perform logical forwarding operations on data messages sent to the L4 Pod for processing by these logical routers.

The Pod configuration agent is responsible for the creation and at least part of the configuration of the L7 Pods for the various logical routers implemented by the L4 Pod. For a given logical router with at least one L7 service configured, the Pod configuration agent first provides the Pod definition data to the cluster controller to create the L7 Pod in the container cluster. In some embodiments, the Pod configuration agent generates a yaml (Yaml Ain't Markup Language) file that defines the specifications for the Pod, which may be based on configuration data from the network management system that is stored in the configuration database. In some embodiments, the Pod specification can include the container image to use (e.g., the application to be executed in the Pod, depending on the type of service(s) to be executed by the Pod), the allocated memory and/or CPU, initialization scripts, and security policies for the Pod. This specification data is passed to the controller cluster (e.g., the Kubernetes API server), which initiates action on the Kubernetes back-end to create the Pod on a particular node of the cluster (typically the node is selected by the Kubernetes scheduling controller).

When the L7 Pod is created, this Pod will typically have a default interface (generally referred to as eth0). However, some embodiments define a second interface for a connection (e.g., an L2 connection) between the L7 Pod and the L4 Pod, via which logical network data messages (i.e., those data messages requiring L7 service processing) are passed between the Pods. This interface information is provided by the network management system to the configuration database on the L4 Pod. Once the L7 Pod has been created, the Pod configuration agent provides network interface configuration attributes (e.g., MAC address, VLAN ID, and IP address) to the L7 Pod (e.g., via Kubernetes ConfigMap). In some embodiments, this causes the L7 Pod to execute a script to configure a new interface (e.g., eth1) for connectivity with the datapath executing in the L4 Pod. The datapath is also configured with this information (e.g., by the network management system agent) so that it can send data messages to the L7 Pod for processing as needed.

In some embodiments, the L7 Pod also executes a database client that is configured to retrieve the service processing configuration for that pod in the L4 Pod configuration database. In some embodiments, the service processing configuration is the configuration for the specific L7 service (s) performed by the L7 Pod that are configured by the user (e.g., network administrator, security administrator, etc.) through the network management system. That is, this data specifies how TLS proxy should be performed, a specific L7 load balancing configuration, etc., depending on the type of service(s) performed by the L7 Pod. In some embodiments, if the L7 Pod performs security services, any security keys needed are published to the L4 Pod (e.g., via a management plane agent that bypasses the configuration database). In some embodiments, the Pod configuration agent executing on the L4 Pod uses a Kubernetes secret scheme to provide these keys to the L7 Pod.

In some embodiments, for a given L7 service of a single logical router, the L4 Pod will initiate the instantiation of multiple L7 Pods. The Pod configuration agent, in some embodiments, determines when additional Pods are needed, and communicates with the cluster controller to instantiate additional L7 Pods in the manner described above. Similarly, if the number of L7 Pods should be reduced, the Pod configuration agent communicates with the cluster controller to delete one or more L7 Pods for a logical router.

When a given service is implemented by multiple L7 Pods, in some embodiments the datapath executing on the L4 Pod is responsible for load balancing between the Pods. When the datapath receives a data message, the datapath first determines which logical router configuration should be applied to the data message (e.g., based on the source of the data message and/or other context attached to the data message). In applying this logical router configuration (i.e., performing L3/L4 processing), if the datapath determines that the data message requires processing by a particular L7 service, the datapath selects one of the L7 Pods that performs the particular service. In some embodiments, the load balancing (i.e., selection of one of the L7 Pods) is performed in such a way that all of the data messages for any given flow are forwarded to the same L7 Pod (e.g., using a deterministic algorithm, storing connection state, etc.).

When forwarding a data message to an L7 Pod, the datapath uses the L2 connection that was setup between the L4 Pod and the L7 Pod. As noted above, in some embodiments, the Pod configuration agent provides the L7 Pod with information for a new interface that is used for this connection between the L4 and L7 Pods. The datapath forwards data messages in need of L7 processing by a particular L7 Pod to this interface of the L7 Pod. In addition, after performing service processing on the data message, the L7 Pod sends the data message back to the L4 Pod for further processing (assuming that the data message is not blocked/dropped by the L7 Pod). The L4 Pod can then forward the data message to another L7 Pod (if additional service processing is required and the L7 services are split into different Pods) or to its next destination (e.g., out of the network, to a logical network endpoint, etc.).

The L2 construct via which the data messages are sent between the L4 Pod and an L7 Pod, in some embodiments, depends on the type of networking used in the container cluster as well as whether the L7 Pod is on the same node as the L4 Pod. In some embodiments, a virtual switch or set of virtual switches are used to connect the L4 Pod with an L7 Pod. For example, if the L4 Pod and L7 Pod are executing on the same node (e.g., a virtual machine), some embodiments execute and configure an Open vSwitch (OVS) bridge to which both of these Pods connect. In this case, the datapath of the L4 Pod sends the data message (e.g., encapsulated with the interface address of the L7 Pod) onto the bridge, which delivers the data message to the interface of the L7 Pod. The L7 Pod processes the data message and returns the data message (e.g., encapsulated with the interface address of the L4 Pod) to the bridge, which delivers the processed data message to the interface of the L4 Pod.

On the other hand, if the L7 Pod executes on a different node (e.g., a different virtual machine) of the cluster from the L4 Pod, some embodiments execute and configure OVS bridges on both of the nodes. In this case, the bridges not only connect to the Pods on their respective nodes, but also each bridge is configured with a tunnel port (that, e.g., connects to a virtual tunnel endpoint (VTEP) of their respective nodes). To send a data message to the L7 Pod, the datapath of the L4 Pod sends the data message (e.g., encapsulated with the interface address of the L7 Pod) to the bridge on its node, which tunnels the data message to the corresponding bridge on the node with the L7 Pod (e.g., using a second layer of encapsulation). If the two nodes execute on the same host computer (e.g., on the same hypervisor), then the data message is tunneled via a virtual switch of the hypervisor. If the two nodes execute on different host computers, then the data message is tunneled via another underlay network.

In some embodiments, the L4 Pod has separate interfaces, connecting to separate bridges executing on its node, for each L7 Pod to which the L4 Pod sends data messages for service processing. In other embodiments, a single bridge is used with one L4 Pod interface shared by data traffic to and from all of the L7 Pods. In some such embodiments, different VLANs are used (for different sub-interfaces) for traffic with each L7 Pod in order to differentiate the traffic.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a system for implementing one or more logical routers in a container cluster (e.g., a Kubernetes cluster) having multiple nodes that each execute a set of Pods. In some embodiments, each of a set of the logical routers of a logical network performs layer 7 services (e.g., TLS proxy, load balancing service) on at least a subset of the logical network data traffic that the logical router processes. Each of these logical routers has its functionality divided across multiple Pods. Specifically, some embodiments deploy a first Pod that performs data forwarding operations (e.g., layer 2-layer 4 operations) for multiple logical routers as well as one or more separate Pods for each of these logical routers to perform services (e.g., layer 7 service operations) for its respective logical router.

In some embodiments, the cluster controllers (e.g., executing on a master node of the Kubernetes cluster) assign the first Pod (that performs data forwarding operations for multiple logical routers, herein referred to as the "L4 Pod") to a specific first node of the cluster and then distributes the other logical router pods (the service Pods, herein referred to as "L7 Pods") across a set of worker nodes (possibly including the first node). Some embodiments affinitize the L4 Pod to the first node (i.e., so that this Pod is pinned to this node) while the L7 Pods may be moved between the nodes based on resource usage or other factors.

Figure 1:
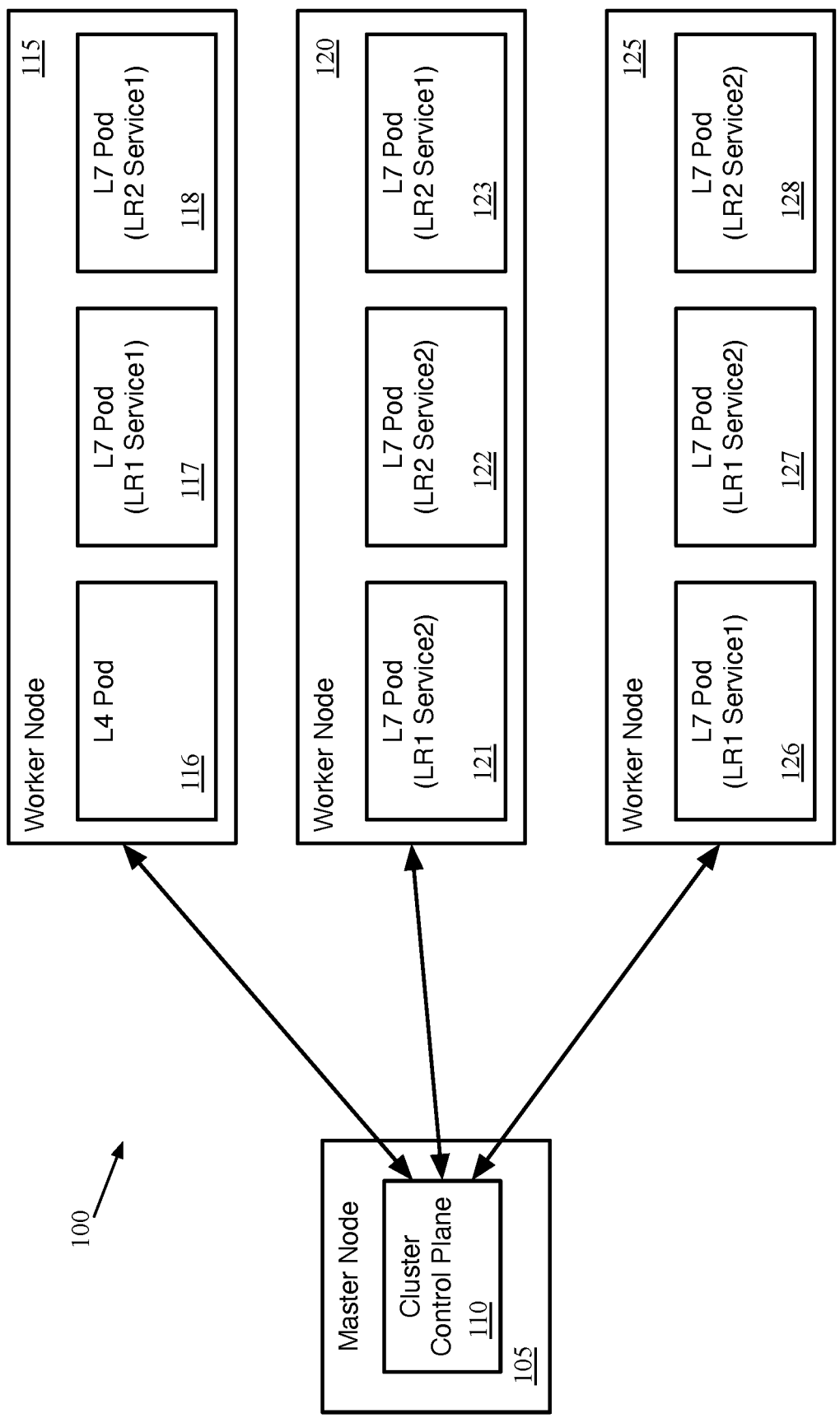
FIG. 1 conceptually illustrates an overview of a Kubernetes cluster of some embodiments in which a set of Pods implement multiple logical routers for a logical network.

FIG. 1 conceptually illustrates an overview of a Kubernetes cluster 100 of some embodiments in which a set of Pods implement multiple logical routers for a logical network. As shown, the cluster 100 includes a master node 105 that executes a set of cluster control plane components 110 as well as a set of worker nodes 115, 120, and 125, each of which execute a respective set of Pods that collectively implement the set of logical routers. Specifically, the first worker node 115 executes an L4 Pod 116 and two L7 Pods 117 and 118. These L7 Pods 117 implement respective L7 services for two different logical routers. For both of these logical routers, the L4 Pod 116 implements logical forwarding (e.g., routing) operations as well as L4 operations (e.g., network address and/or port translation). The second worker node 120 executes three L7 Pods 121-123. The first of these Pods 121 implements a second L7 service for the first logical router, the second Pod 122 implements a second L7 service for the second logical router, and the third Pod 123 implements the first L7 service for the second logical router (allowing the L4 Pod to load balance between the Pod 118 and the Pod 123) for the provision of this L7 service. Finally, the third worker node also executes three L7 Pods 126-128. In this case, the first Pod 126 implements the first L7 service for the first logical router, the second Pod 127 implements the second L7 service for the first logical router, and the third Pod 128 implements the second L7 service for the second logical router.

Each logical router is configured (e.g., by a network administrator) to perform a respective set of services on data messages handled by that logical router. In this case, each of the two logical routers is configured to perform two different services on data messages processed by the respective logical routers. These services may be the same two services for each of the logical routers or different sets of services. The services, in some embodiments, include L5-L7 services, such as L7 firewall services, transport layer security (TLS) services (e.g., TLS proxy), L7 load balancing services, uniform resource locator (URL) filtering, and domain name service (DNS) forwarding. As in this example, if multiple such services are configured for a given logical router, each of these services is implemented by a separate L7 Pod in some embodiments. In other embodiments, one L7 Pod performs all of the services configured for its logical router. Furthermore, some embodiments execute a single L7 Pod for each service (or for all of the services), while other embodiments (as in this example) execute multiple L7 Pods and load balance traffic between the Pods.

The master node 105, in some embodiments, includes various cluster control plane components 110 that control and manage the worker nodes 105, 110, and 115 of the cluster 100 (as well as any additional worker nodes in the cluster). In different embodiments, a cluster may include one master node or multiple master nodes, depending on the size of the cluster deployment. When multiple master nodes are included for a large cluster, these master nodes provide high-availability solutions for the cluster. The cluster control plane components 110, in some embodiments, include a Kubernetes application programming interface (API) server via which various Kubernetes constructs (Pods, custom resources, etc.) are defined for the cluster, a set of controllers to run the cluster, a state database for the cluster (e.g., etcd), and a scheduler for scheduling Pods across the worker nodes and for scheduling functionalities for worker nodes in the cluster. In different embodiments, the master node 105 may execute on the same host computer as some or all of the worker nodes of the cluster or on a separate host computer from the worker nodes.

Figure 2:
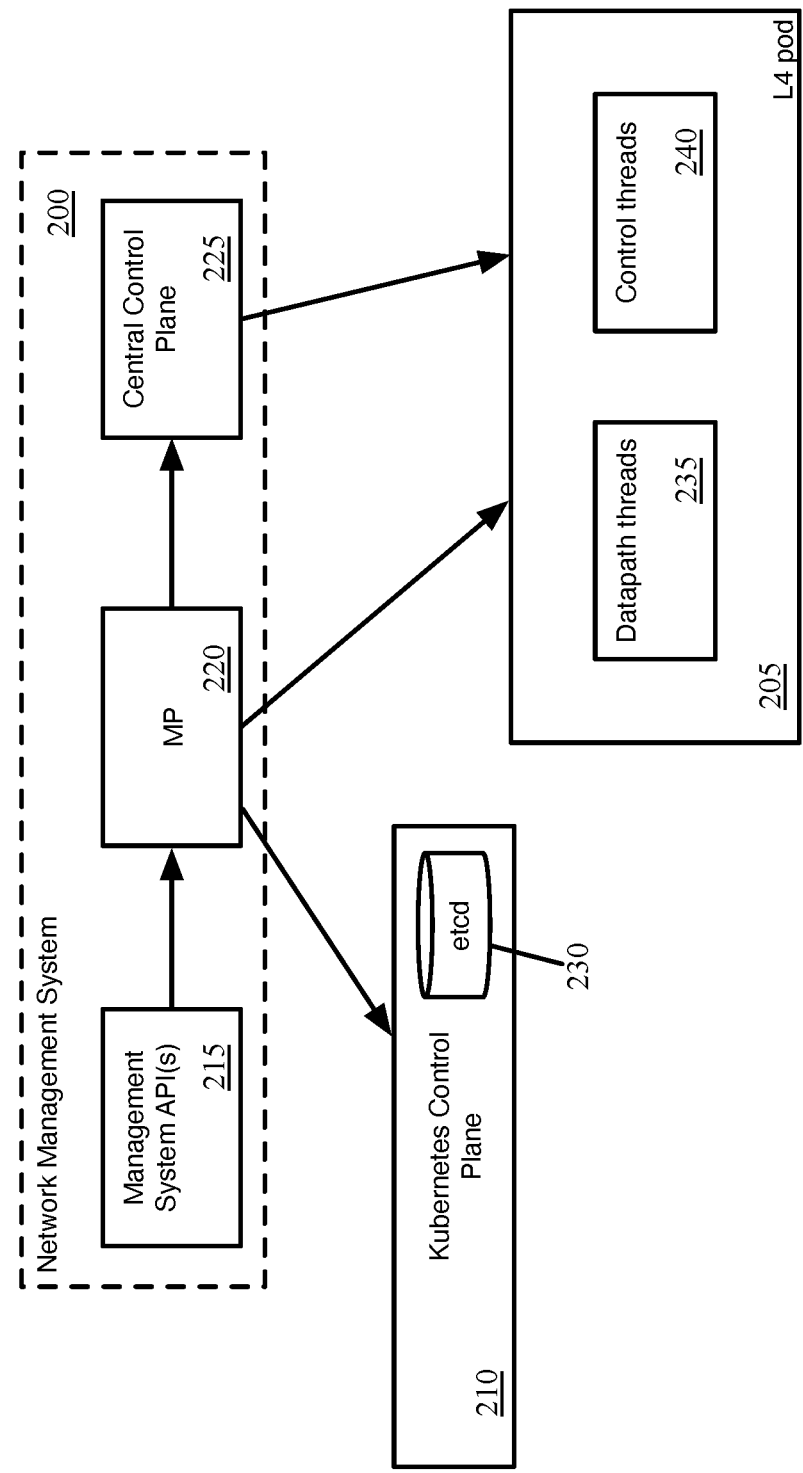
FIG. 2 conceptually illustrates a network management system that provides network configuration information to an L4 Pod as well as to the Kubernetes control plane.

In some embodiments, the logical router (and additional logical network elements and policies implemented in the cluster) are managed by an external network management system. FIG. 2 conceptually illustrates a network management system 200 that provides network configuration information to an L4 Pod 205 as well as to the Kubernetes control plane 210. The network management system 200 includes a set of management system APIs 215, a management plane 220, and a central control plane 225. In some embodiments, the network management system is implemented outside of the Kubernetes cluster or (at least partially) in a separate Kubernetes cluster. For instance, the network management system 200 might reside in an enterprise datacenter and manage both a physical datacenter as well as the Kubernetes cluster in which the logical routers are implemented (which might be implemented in the enterprise datacenter or in a public cloud datacenter).

The management system APIs 215 are the interface through which a network administrator defines a logical network and its policies. This includes the configuration of the logical forwarding rules and the L7 services for the logical routers implemented within the Kubernetes cluster. The administrator (or other user) can specify, for each logical router, which L7 services should be performed by the logical router, on which data messages processed by the logical router each of these L7 services should be performed, and specific configurations for each L7 service (e.g., how L7 load balancing should be performed, URL filtering rules, etc.).

The management plane 220, in some embodiments, communicates with both the Kubernetes cluster control plane 210 and the L4 Pod 205 (or multiple L4 Pods in case there is more than one L4 Pod in the cluster). In some embodiments, the management plane 220 is responsible for managing life cycles for at least some of the Pods (e.g., the L4 Pod) via the Kubernetes control plane 210.

The Kubernetes control plane 210, as described above, includes a cluster state database 230 (e.g., etcd), as well as an API server. The API server (not shown in this figure), in some embodiments, is a frontend for the Kubernetes cluster that allows for the creation of various Kubernetes resources. In some embodiments, in order to add a new Pod to the cluster, either the management plane 220 or another entity (e.g., an agent executing on the L4 Pod 205) interacts with the Kubernetes control plane to create this Pod.

The management plane 220 also provides various logical network configuration data (e.g., forwarding and service policies) to the central control plane 225. The central control plane 225, in some embodiments, provides this information directly to the Pods. In some embodiments, various agents execute on the nodes and/or Pods to receive configuration information from the central control plane 225 and/or the management plane 220 and configure entities (e.g., forwarding elements, services, etc.) on the Pods (or in the nodes for inter-Pod communication) based on this configuration information. For instance, as described below, logical router configuration is provided to the L4 Pod by the central control plane 225.

The L4 Pod 205, as shown, executes both datapath threads 235 and control threads 240. In some embodiments, the L4 Pod 205 executes a data plane development kit (DPDK) datapath that uses a set of run-to-completion threads (the datapath threads 235) for processing data messages sent to the logical router as well as a set of control threads 240 for handling control plane operations. Each datapath thread 235, in some embodiments, is assigned (i.e., pinned) to a different core of a set of cores of a computing device on which the first Pod executes, while the set of control threads 240 are scheduled at runtime between the cores of the computing device. The set of data message processing operations performed by the L4 pod (e.g., by the datapath threads 235) includes L2-L4 operations, such as L2/L3 lookups, tunnel termination/encapsulation, L2-L4 firewall processing, packet updating, and byte counters.

Figure 3:
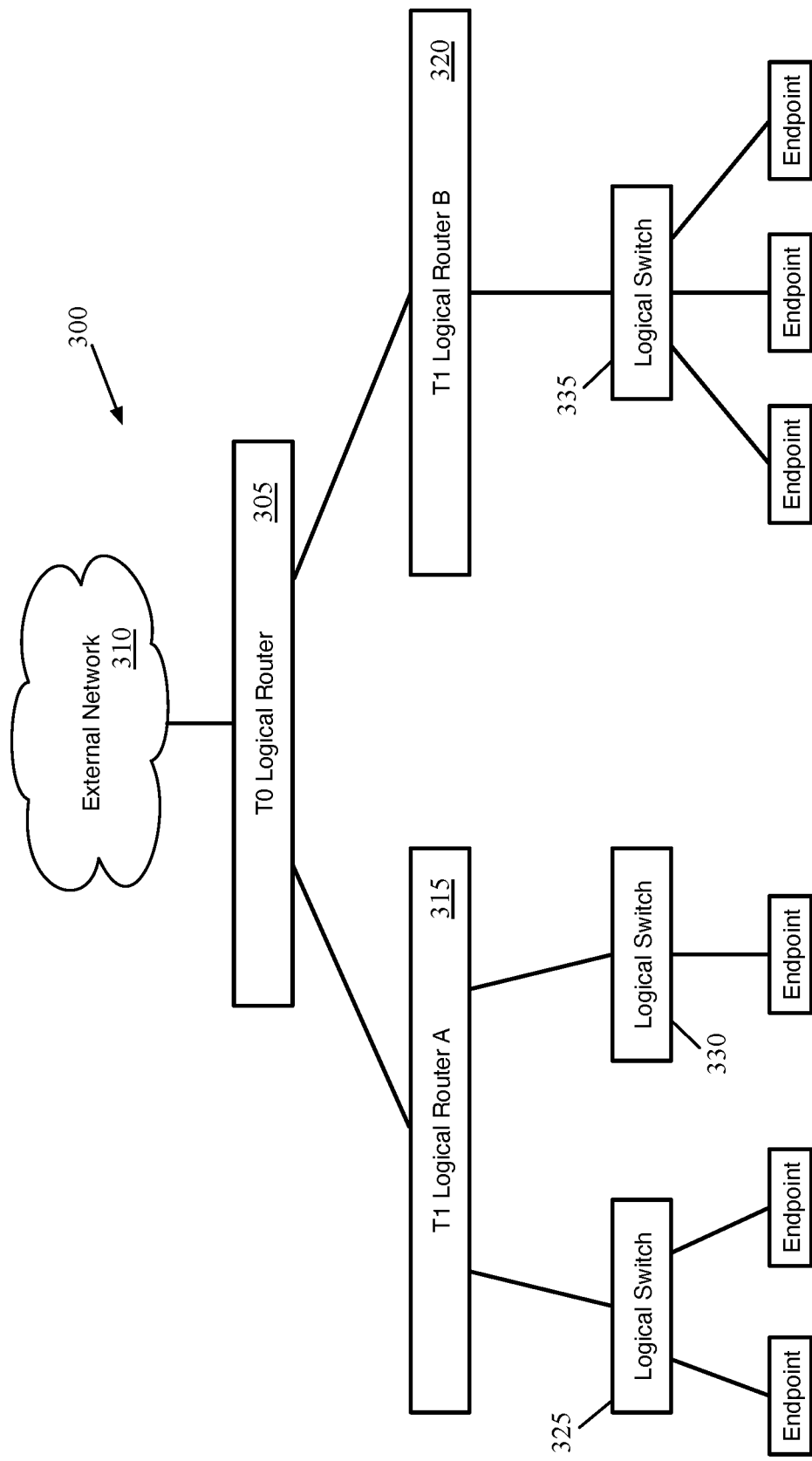
FIG. 3 conceptually illustrates a logical network of some embodiments.

As mentioned, in some embodiments, the logical routers belong to a logical network. This logical network connects network endpoints (e.g., various applications), which may also execute on Pods of the cluster, to each other as well as to external endpoints. FIG. 3 conceptually illustrates such a logical network 300. As shown, the logical network includes a T0 logical router 305 that connects the logical network 300 to an external network 310, two T1 logical routers 315 and 320, and three logical switches 325-335 to which various network endpoints connect.

The T0 logical router 305, in some embodiments, is a logical router of a first type (first tier) that interfaces with external networks and includes both centralized and distributed components. The T0 logical router 305 handles all traffic entering and exiting the logical network 300 and exchanges routes (e.g., using BGP or another routing protocol) with the external network 310. The T1 logical routers 315 and 320 connect groups of logical switches and provide administrator-configured services (e.g., L7 services) for data traffic sent to and from these logical switches. When one endpoint connected to a particular logical switch sends data traffic to another endpoint connected to that particular logical switch, no logical router processing is performed and therefore no L7 services need to be applied to the data traffic. However, when traffic is exchanged between such a logical network endpoint to an endpoint connected to another logical switch (or external to the logical network), L7 services configured for any of the logical routers between those network endpoints are applied to the data traffic. Thus, if a network endpoint connected to the first logical switch 325 sends traffic to the network endpoint connected to the second logical switch 330 (or to an external endpoint), L7 services configured for the first logical router 315 are applied to this traffic. If the same network endpoint sends traffic to a network endpoint connected to the third logical switch 335, then L7 services configured for both the first logical router 315 and the second logical router 320 are applied to the traffic.

In some embodiments, the logical network 300 is implemented in a distributed manner, either in the Kubernetes cluster in which the logical routers are implemented, another datacenter (or separate cluster in the same datacenter as the logical routers) in which the network endpoints reside, or a combination thereof. In some embodiments, the network endpoints reside in the same Kubernetes cluster (and at least partially on the same nodes) as the logical routers. In this case, the logical switches and, in some cases, distributed components of the logical routers, are implemented by various software networking mechanisms that execute on the network endpoint Pods, the logical router Pods, the nodes on which these Pods reside (i.e., the networking constructs outside of the Pods), or a combination thereof.

Figure 4:
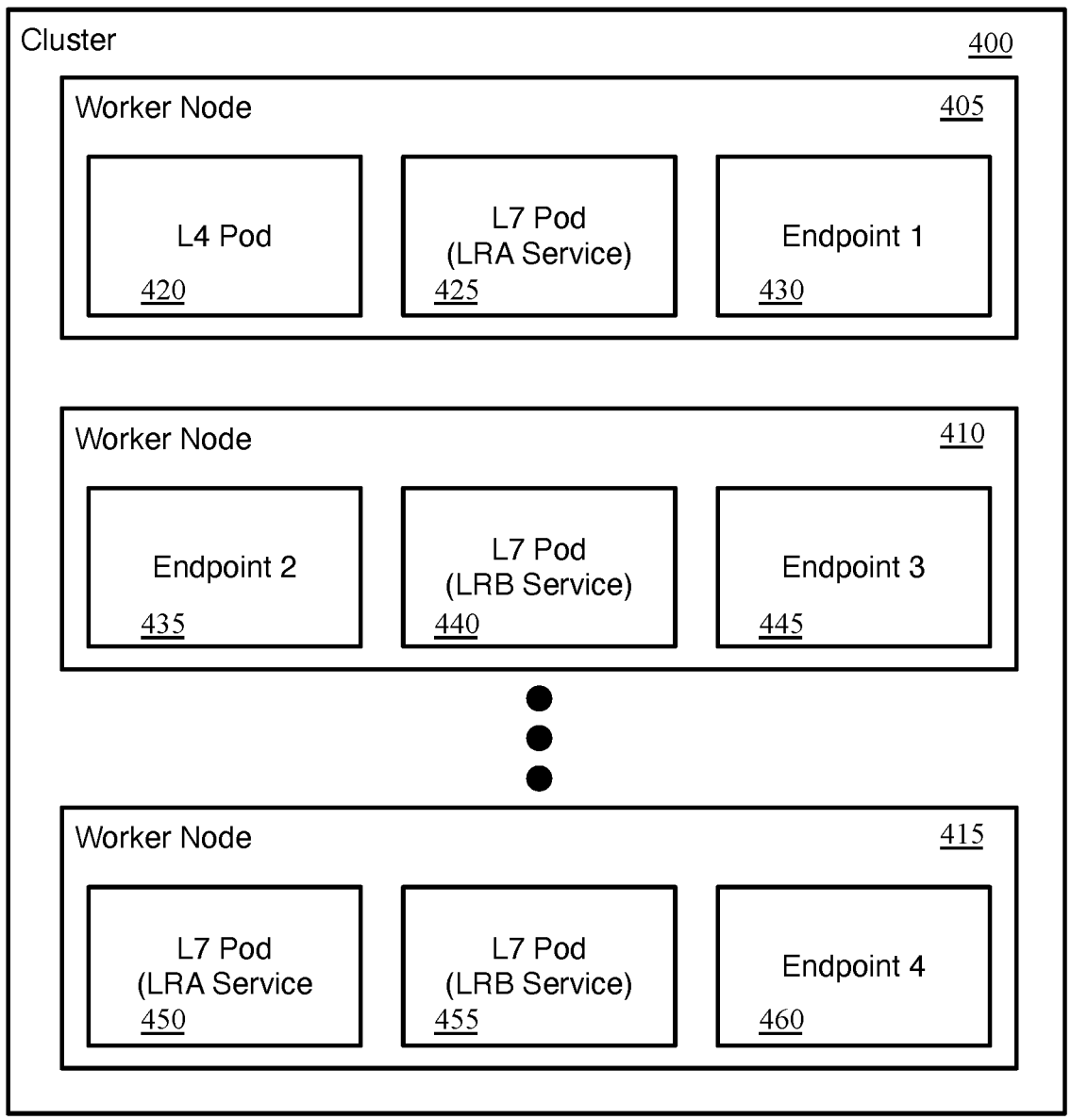
FIG. 4 conceptually illustrates a Kubernetes cluster within which the logical network of FIG. 3 is implemented.

FIG. 4 conceptually illustrates a Kubernetes cluster 400 within which the logical network 300 is implemented. This figure, it should be noted, does not include various aspects of the cluster, such as the control plane, ingress processing, etc. As shown, the cluster 400 includes multiple worker nodes 405-415 on which various Pods execute. The first worker node 405 executes an L4 Pod 420 that implements the forwarding aspects of the logical routers 305, 315, and 320, an L7 Pod 425 that implements the L7 services of the first T1 logical router 315, and one of the network endpoints 430. The second worker node 410 executes two network endpoints 435 and 445 as well as an L7 Pod 440 that implements the L7 services of the second T1 logical router 320. The third worker node 415 executes one network endpoint 460 as well as two L7 Pods 450 and 455 that respectively implement the L7 services of the first and second T1 logical routers 315 and 320. Other worker nodes may execute additional network endpoints, additional L7 Pods for the T1 logical routers (or for the T0 logical router 305), etc.

As described above, the network management system of some embodiments configures various components in the Kubernetes cluster to implement the logical network. In some embodiments, the L4 Pod that implements the logical forwarding processing for the logical routers of the logical network is also responsible for helping to configure the L7 Pods for those logical routers. The L4 Pod receives configuration data for a given logical router from a network management system that defines the logical network, provides Pod definition data to a cluster controller (e.g., a Kubernetes API server) to create an L7 Pod, and then communicates directly with the L7 Pod to further configure that Pod. Specifically, in some embodiments, the L4 Pod provides to the L7 Pod (i) networking information to enable a connection for data messages between the L4 and L7 Pods and (ii) configuration data that defines the L7 services for the L7 Pod to perform on the data messages sent from the L4 Pod to the L7 Pod (i.e., via said connection enabled by the networking information).

Figure 5:
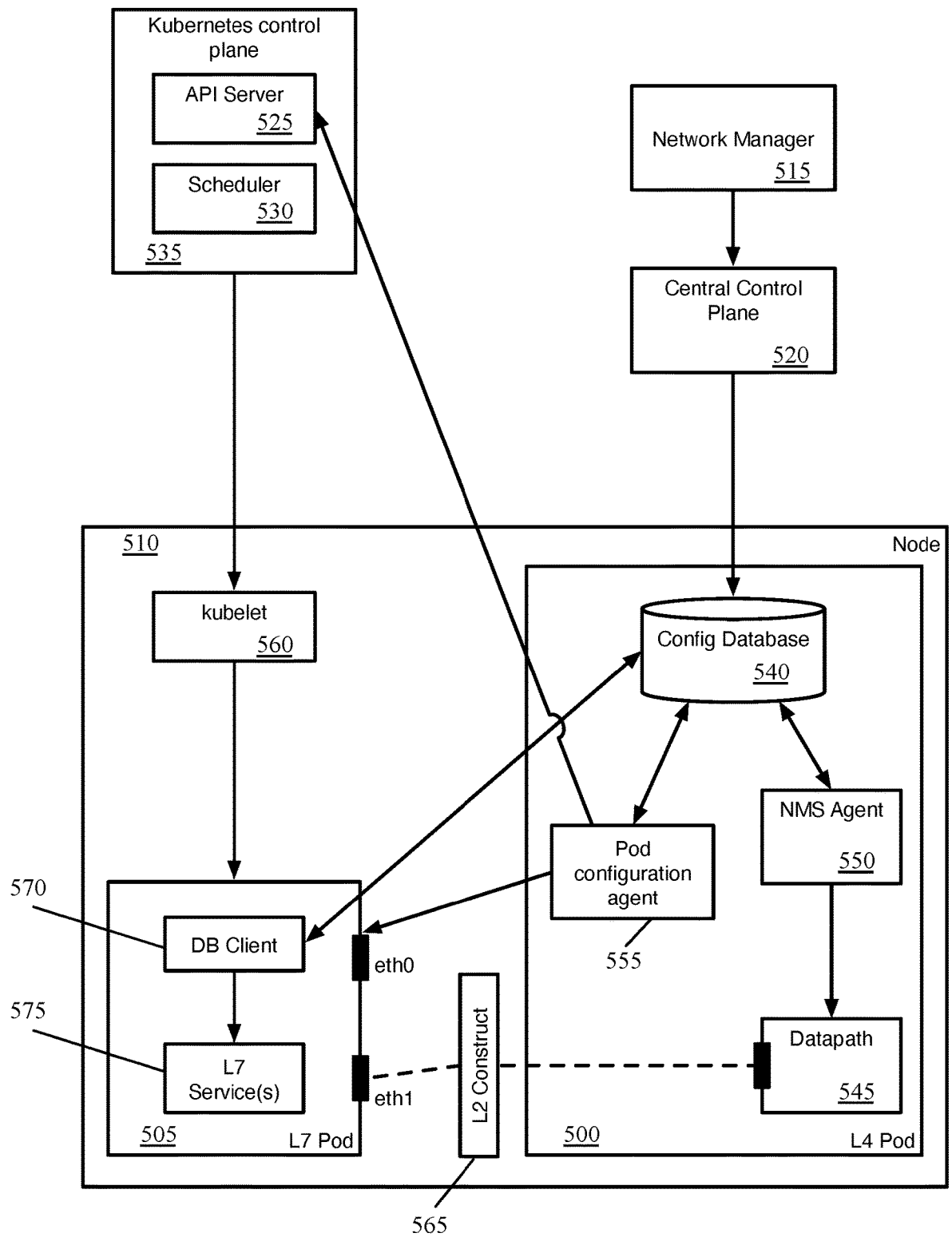
FIG. 5 conceptually illustrates the architecture of an L4 Pod of some embodiments that helps to create and configure an L7 Pod operating on the same node as the L4 Pod.

FIG. 5 conceptually illustrates the architecture of an L4 Pod 500 of some embodiments that helps to create and configure an L7 Pod 505 operating on the same node 510 as the L4 Pod. In addition to the Pods 500 and 505 operating on the node 510, the figure also illustrates the network manager 515 (e.g., management plane) and central control plane 520 of an external network management system as well as the API server 525 and scheduler 530 of the Kubernetes control plane 535.

The network management system entities, the network manager 515 and central control plane 520, are described above by reference to FIG. 2. To configure the logical routers, the central control plane 520 receives logical router configuration data from the network manager 515 (along with other logical network configuration data), determines that this logical router configuration should be provided to the L4 Pod 500 (possibly in addition to other entities that implement some or all components of the logical routers), and provides the logical router configuration data to the L4 Pod 500.

The Kubernetes control plane 535 is also described above. The API server 525, as noted, is responsible for creating and deleting various Kubernetes resources (e.g., Pods, services, custom resources, etc.) based on API requests. These requests may come from external sources (e.g., the network manager 515) as well as internal sources (e.g., the L4 Pod 500). Upon receipt of a command to create a Pod or other resource, in some embodiments the API server defines the Pod in a configuration state database (not shown in this figure). The scheduler 530 is responsible for assigning the newly created Pod to one of the nodes based on a variety of factors (e.g., resources available, locations of related Pods, etc.). The control plane 535 (e.g., the API server 525 or another entity) then informs the node of the assigned Pod so that the Pod can be created on that node.

The kubelet 560, while separate from the Kubernetes control plane 535, acts in concert with the control plane. The kubelet is a Kubernetes component that executes on each node of a cluster and acts as an agent for the control plane 535. The kubelet 560 registers the node 510 with the API server 525. In addition, the kubelet 560 is responsible for creating and/or deleting Pods on its node 510 and ensuring that these Pods are running and healthy.

The L4 Pod 500 stores a configuration database 540, in addition to executing a datapath 545, a network management system agent 550, and a Pod configuration agent 555. The configuration database (e.g., NestDB) receives and stores configuration data for the logical routers implemented by the L4 Pod 500 from the central control plane 520. In some embodiments, for each logical router, this configuration data includes at least (i) logical forwarding configuration, (ii) L7 service configuration, and (iii) internal network connectivity between the L4 and L7 pods. The logical forwarding configuration defines routes (as well as L3/L4 services, such as network address translation) to be implemented by the L4 Pod 500, while the L7 service configuration defines the services to be performed by the logical router and the configuration for each of those services. The internal network connectivity, in some embodiments, is defined by the network management system (e.g., is transparent to the network administrator) and specifies how the L4 Pod 500 and the L7 Pod(s) send data traffic back and forth.

The network management system agent 550, in some embodiments, reads logical forwarding configuration data for each of the logical routers that the L4 Pod 500 is responsible for implementing from the configuration database 540 and uses this logical forwarding configuration data to configure the datapath 545 to perform logical forwarding operations on data messages sent to the L4 Pod for processing by any of these logical routers. In some embodiments, the network management system agent 550 configures routing tables (e.g., virtual routing and forwarding (VRF) tables) on the datapath 545 for each of the logical routers.

The datapath 545 implements the data plane for the logical routers. The datapath 545 includes one or more interfaces through which it receives logical network data traffic (e.g., from networking constructs on the node 510) and performs logical forwarding operations. The logical forwarding operations include routing data traffic to other logical routers, to network endpoints, to external destinations, and/or to one or more L7 Pods. In some embodiments, policy-based routing is used to ensure that certain data messages are initially routed to one or more L7 Pods and only routed towards an eventual destination after all necessary L7 services have been performed on the data messages.

The Pod configuration agent 555 is responsible for the creation and at least part of the configuration of the L7 Pods (e.g., the L7 Pod 505 for the various logical routers implemented by the L4 Pod 500. When the Pod configuration agent 555 detects that a new L7 Pod needs to be created, the Pod configuration agent interacts with the cluster API server 525 to create this Pod. Similarly, the Pod configuration agent 555 detects when an L7 Pod should be deleted and interacts with the cluster API server 525 to remove the L7 Pod. To create the L7 Pod 505, the Pod configuration agent 555 sends a message to the API server with a set of Pod definition data that defines specifications for the Pod. This causes the API server 525 to create the Pod and, in this case, for the scheduler to assign the new L7 Pod to the node 510. The Kubernetes control plane 535 then notifies the kubelet 560 to create the new Pod 505 on the node 510.

The Pod configuration agent 555 is also responsible for providing the network interface configuration to the L7 Pod 505. When the L7 Pod 505 is initially created, it has a first interface (eth0), which is used for typical inter-Pod communications (e.g., by the Pod configuration agent 555). In some embodiments, the Pod configuration agent 555 provides the L7 Pod 505 with network interface configuration attributes (e.g., MAC address, VLAN ID, and IP address) for a second interface. In some embodiments, the central control plane provides this network interface information to the configuration database 540, from which the Pod configuration agent 555 retrieves the information to send the information to the L7 Pod 505. This causes the L7 Pod 505 to execute a script to configure a new interface (the interface eth1) for connectivity with the datapath executing in the L4 Pod. The datapath 545 is also configured with this information (e.g., by the network management system agent 550) so that it can send data messages to the L7 Pod for processing as needed. These data messages are sent via an L2 construct 565 on the node 510, which is described in further detail below.

As shown, the L7 Pod 505 executes a database client 570 and L7 services 575. In some embodiments, the type of L7 services 575 that execute in the L7 Pod 505 are determined based on the Pod definition data specified by the Pod configuration agent 555 (and thus the Pod specification provided to the kubelet 560 by the control plane 535). Thus, an L7 Pod performing TLS proxy will execute different L7 service module(s) than an L7 Pod performing L7 load balancing. The database client 570, in some embodiments, is configured to retrieve the service processing configuration from the configuration database 540. In some embodiments, the database client 570 listens for its specific configuration (pushed down to the configuration database 540 from the central control plane 520 based on administrator configuration) and retrieves this configuration. The database client 570 provides the configuration to the L7 service module(s) 575 so that these modules perform their L7 services in accordance with the administrator-specified configuration.

Figure 6:
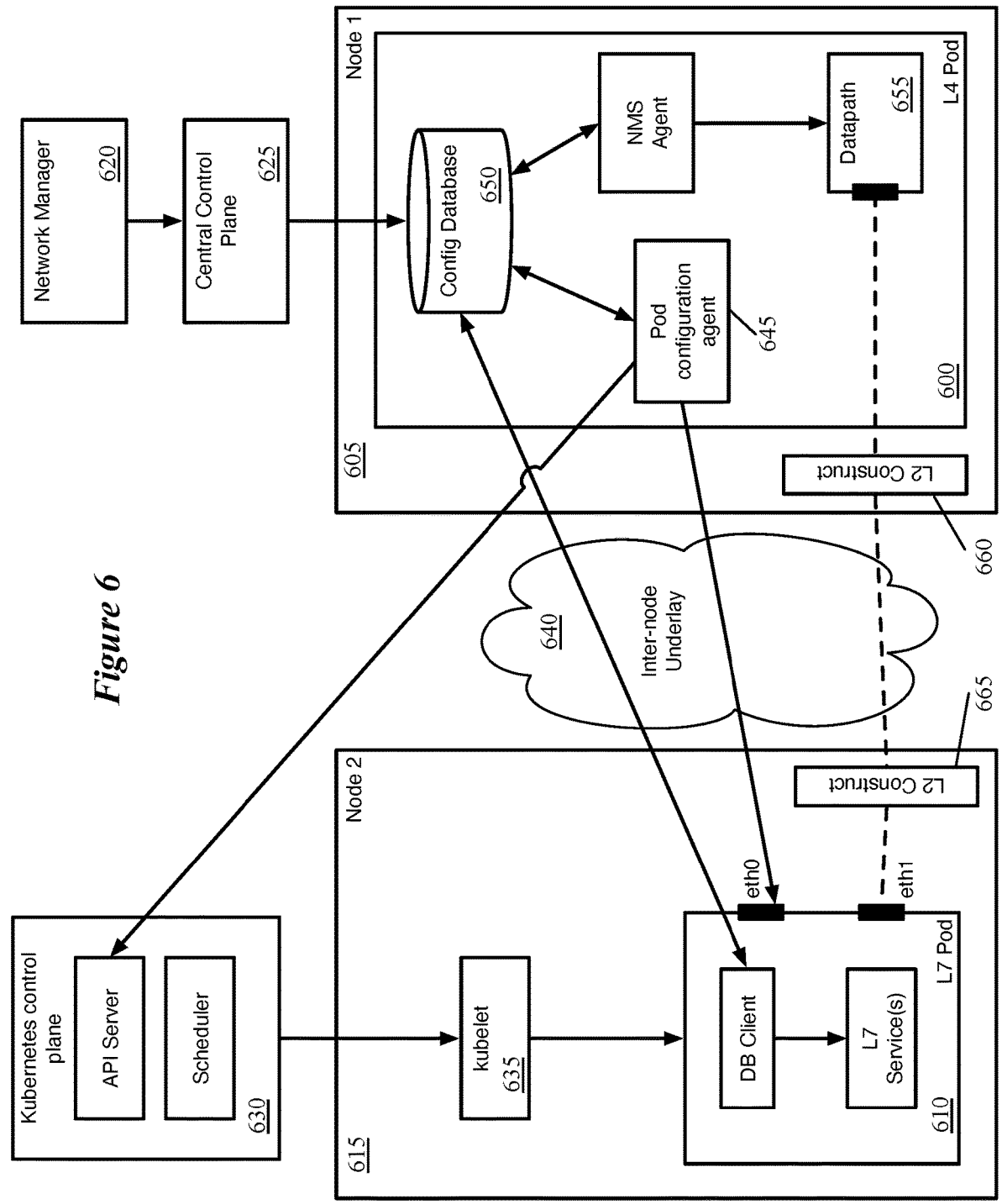
FIG. 6 conceptually illustrates an L4 Pod of some embodiments operating on a first node that helps to create and configure an L7 Pod operating on a different node.

The L4 Pod is also responsible for configuring L7 Pods that execute on other nodes (i.e., not on the same node as the L4 Pod). FIG. 6 conceptually illustrates an L4 Pod 600 of some embodiments operating on a first node 605 that helps to create and configure an L7 Pod 610 operating on a different node 615. In this case, the network manager 620, central control plane 625, and Kubernetes control plane 630 operate in the same manner as described above by reference to FIG. 5. In addition, the L4 Pod 600 and L7 Pod 610 execute the same components as in the previous figure. While the kubelet 635 is shown for the second node 615 as this kubelet helps create the L7 Pod 610 on this node, it should be understood that a kubelet also executes on the first node 605 (as this component executes on each node of the cluster).

In this example, communication between the L4 Pod 600 and the L7 Pod 610 travel through an inter-node underlay network 640. The nature of this underlay network 640 depends on the datacenter within which the nodes execute as well as whether the nodes are on the same host or different hosts. As shown, the configuration communication (i.e., the Pod configuration agent 645 sending network interface configuration and the retrieval of L7 service configuration from the configuration database 650) passes through this underlay. In addition, data traffic sent between the datapath 655 and the L7 Pod 610 is sent through L2 constructs 660 and 665 on the two nodes in addition to the underlay network 640.

Figure 7:
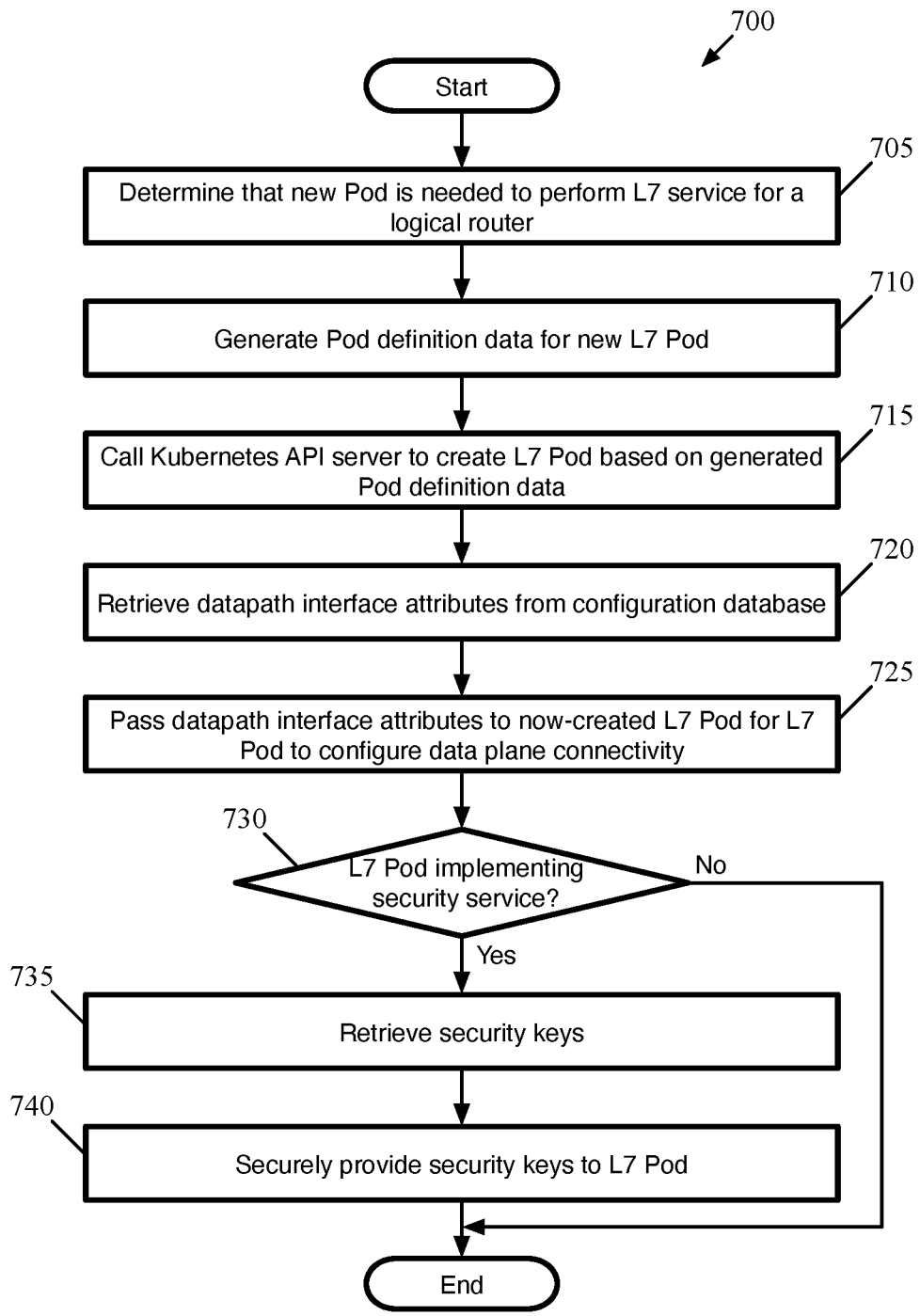
FIG. 7 conceptually illustrates a process of some embodiments for instantiating and configuring a new L7 Pod to implement an L7 service for a logical router.

As noted, the operations performed by the L4 Pod to configure an L7 Pod are the same irrespective of whether the L7 Pod is on the same node as the L4 Pod or a different node. FIG. 7 conceptually illustrates a process 700 of some embodiments for instantiating and configuring a new L7 Pod to implement an L7 service for a logical router. The process 700 is performed by an L4 Pod (e.g., by the Pod configuration agent on the L4 Pod) that implements the logical forwarding and/or L2-L4 services for the same logical router (possibly in addition to multiple other logical routers).

As shown, the process 700 begins by determining (at 705) that a new L7 Pod is needed to perform an L7 service (or multiple L7 services) for a logical router. The Pod configuration agent of the L4 Pod may make this determination upon detecting that configuration data has been stored in the configuration database for a new logical router with one or more services configured or if configuration data for a new service for an existing logical router has been stored in the configuration database. In some embodiments, the Pod configuration agent listens to the configuration database to detect any updates to L7 service configurations. In addition, in some embodiments, the Pod configuration agent determines when additional Pods are required for an existing L7 service (e.g., based on the load on the existing L7 Pods implementing that service). Similarly, the agent may determine when the number of Pods implementing a particular service for a particular logical router should be reduced, in which case a different process is performed to delete an L7 Pod.

Upon determining that a new L7 Pod needs to be created, the process 700 generates (at 710) Pod definition data for this Pod. In some embodiments, the Pod configuration agent generates a yaml (Yaml Ain't Markup Language) file that defines the specifications for the Pod. In some embodiments, the Pod specification can include the container image to use (e.g., the application to be executed in the Pod, depending on the type of service(s) to be executed by the Pod), the allocated memory and/or CPU, initialization scripts, and security policies for the Pod. The type of application(s) to be executed is determined based on configuration data specifying the type of L7 services. The other information is also be specified by the network management system via the configuration database in some embodiments. In other embodiments, the Pod configuration agent is configured to determine the hardware resources to be allocated to the pod.

The process 700 then calls (at 715) the Kubernetes API server to create the new L7 Pod based on the generated Pod definition data. In some embodiments, the Pod definition data is formatted so that the API server can define the Pod using the various specifications. The API server defines the new Pod in a cluster state database in some embodiments, which initiates a process by which the scheduler assigns the Pod to a node and the kubelet on that node creates the Pod per the specifications.

When the L7 Pod is created on its node, it will typically have a default interface (often referred to as eth0) that can be used for inter-Pod communication. However, some embodiments define a second interface for a connection (e.g., an L2 connection) between the L7 Pod and the L4 Pod, via which logical network data messages (i.e., those data messages requiring L7 service processing) are passed between the Pods.

To define this interface, the process retrieves (at 720) datapath interface attributes from the configuration database. In some embodiments, the network management system provides the datapath interface information to the configuration database on the L4 Pod after internally generating the information. That is, unlike the logical router forwarding and service configurations, the datapath interface information is not based on administrator input. The interface configuration attributes, in some embodiments, include a MAC address, a VLAN ID, and an IP address for the interface.

The process 700 passes (at 725) these datapath interface attributes to the L7 Pod so that the L7 Pod can configure its data plane connectivity. In some embodiments, the MAC and IP addresses for the interface of the L4 Pod datapath are also provided to the L7 Pod so that it can communicate with that datapath. In some embodiments, to provide the interface configuration information to the L4 Pod, the Pod configuration agent uses Kubernetes ConfigMap. This provision of data causes the L7 Pod to execute a script to configure a new interface (e.g., eth1) for connectivity with the datapath executing in the L4 Pod. This new interface has the MAC address, VLAN tag, and IP address provided by the L4 Pod. In addition, the datapath on the L4 Pod is also configured with this interface information (e.g., by the network management system agent on the L4 Pod) so that the datapath can send data messages to the L7 Pod for processing as needed.

Next, the process 700 determines (at 730) whether the L7 Pod implements a security service. Certain L7 services (e.g., TLS proxy) require the L7 Pod to store a set of keys for use in providing the security service(s). If not, then the process 700 ends, as the Pod configuration agent has performed all of its tasks in order to configure the L7 Pod.

If the L7 Pod is implementing a security service, the process 700 retrieves (at 735) security keys. In some embodiments, the keys are published to the L4 Pod via a management plane agent that bypasses the configuration database. The process 700 then securely provides (at 740) these security keys to the L7 Pod. In some embodiments, the Pod configuration agent uses a Kubernetes secret scheme to provide these keys to the L7 Pod.

Figure 8:
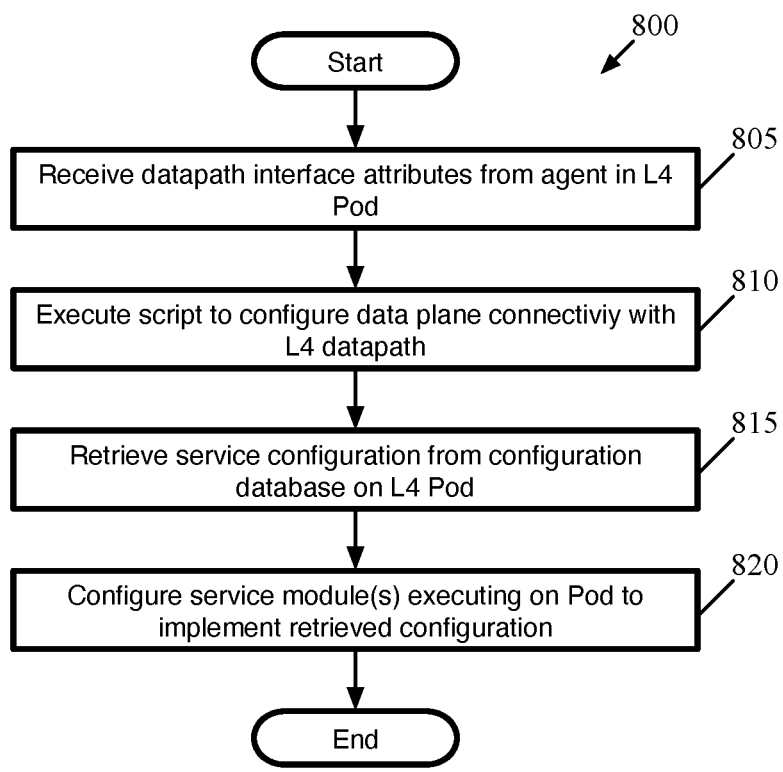
FIG. 8 conceptually illustrates a process of some embodiments for configuring one or service modules to implement a user-defined service configuration.

As mentioned, during the configuration process, the L7 Pod performs a set of actions to configure its data plane interface and the L7 services that it implements. FIG. 8 conceptually illustrates a process 800 of some embodiments for configuring one or service modules to implement a user-defined (e.g., administrator-defined) service configuration. The process 800, in some embodiments, is performed by an L7 pod (e.g., at least in part by the configuration database client executing on the pod).

As shown, the process 800 begins by receiving (at 805) datapath interface attributes from the agent (i.e., the Pod configuration agent) in the L4 Pod. As described above, in some embodiments these attributes specify the MAC address, VLAN ID, and IP address for a new interface to be created for the L7 Pod and are provided to the L7 Pod via Kubernetes ConfigMap. Next, the process 800 executes (at 810) a script to configure data plane connectivity with the L4 datapath. In some embodiments, this script uses the provided datapath interface attributes to (i) create and configure a new network interface on the L7 Pod and (ii) configure the datapath on the L7 Pod to use this interface to return data messages back to the L4 Pod (using the interface addresses of the L4 Pod).

The process 800 also retrieves (at 815) service configuration for the L7 Pod from the configuration database stored on the L4 Pod. In some embodiments, the L7 Pod executes a database client that is configured to retrieve the service processing configuration for that pod in the L4 Pod configuration database. In some embodiments, the service processing configuration is the configuration for the specific L7 service(s) performed by the L7 Pod that are configured by the user (e.g., network administrator, security administrator, etc.) through the network management system. That is, this data specifies how TLS proxy should be performed, a specific L7 load balancing configuration, etc., depending on the type of service(s) performed by the L7 Pod. The database client is configured to listen on the configuration database for configuration that is tagged for (i) its logical router and (ii) the service provided on that L7 Pod (i.e., if the Pod performs TLS proxy for a particular logical router the database client will not retrieve the TLS proxy configuration for any other logical routers or the L7 load balancing configuration for that particular logical router). The process 800 then configures (at 820) the service modules executing on the Pod to implement the retrieved configuration on data messages forwarded to the L7 Pod from the L4 Pod.

When forwarding a data message to an L7 Pod, the datapath on the L4 Pod uses the L2 connection that is setup between the L4 Pod and the L7 Pod. As described above, in some embodiments, the Pod configuration agent on the L4 Pod provides the L7 Pod with network interface information for a new interface that is used for this connection between the L4 and L7 Pods. The datapath forwards data messages in need of L7 processing by a particular L7 Pod to this interface of the L7 Pod. In addition, after performing service processing on the data message, the L7 Pod sends the data message back to the L4 Pod for further processing (assuming that the data message is not blocked/dropped by the L7 Pod). The L4 Pod can then forward the data message to another L7 Pod (if additional service processing is required and the L7 services are split into different Pods) or to its next destination (e.g., out of the network, to a logical network endpoint, etc.).

Figure 9:
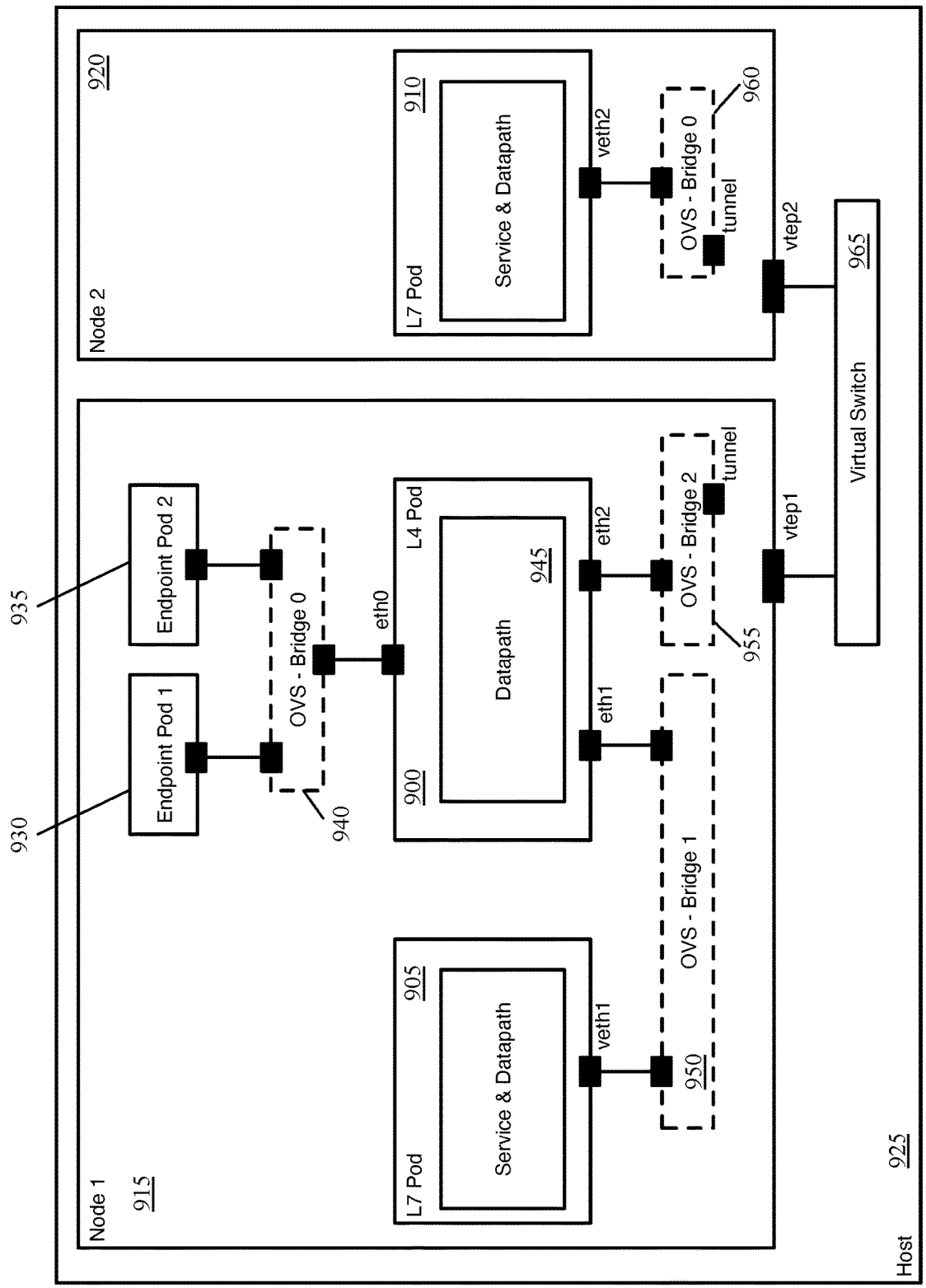
FIGS. 9-11 conceptually illustrates L2 constructs used to connect an L4 Pod to multiple L7 Pods in some embodiments.

The L2 construct via which the data messages are sent between the L4 Pod and an L7 Pod, in some embodiments, depends on the type of networking used in the container cluster as well as whether the L7 Pod is on the same node as the L4 Pod (and, if on different nodes, whether the nodes execute on the same host computer). FIG. 9 conceptually illustrates the L2 constructs used to connect an L4 Pod 900 to a first L7 Pod 905 on the same node 915 as the L4 Pod 900 as well as to a second L7 Pod 910 on a different node 920. Both of the nodes 915 and 920 execute on the same host computer 925 in this case (e.g., as separate virtual machines running on top of the same hypervisor).

In this example, additional endpoint pods 930 and 935 operate on the node 915. These endpoint Pods 930 and 935 are connected to logical switches that, in turn, each connect to one of the logical routers implemented by the L4 Pod 900. As such, the endpoint Pods 930 and 935 connect to a primary interface (eth0) of the L4 Pod 900 via an L2 construct. In this case, the L2 construct is an Open vSwitch (OVS) bridge 940 that executes within the node 915. It should be noted that the endpoint Pods, or other endpoint Pods, can connect to this eth0 interface of the L4 Pod if they execute on other nodes (or even on other hosts) via additional L2 constructs (e.g., a combination of OVS bridges, tunnels, virtual switches, and/or physical network hardware).

The L4 Pod 900 includes a separate interface for each L7 Pod to which it sends data messages for L7 service processing. In the example, there are two L7 Pods 905 and 910 and thus two additional interfaces (eth1 and eth2). The two L7 Pods 905 and 910 may perform the same service for the same logical router (i.e., with data traffic load balanced across the two pods), two different services for the same logical router, or services for different logical routers (either the same service or different services). Each of the L7 Pods 905 and 910 executes a service module and a datapath. These datapaths do not need to perform logical forwarding for (potentially) multiple logical routers, but instead handle the passing of incoming data traffic between the respective interfaces (veth1 for the first L7 Pod 905 and veth2 for the second L7 Pod 910) and the service modules.

Internally, the datapath 945 of the L4 Pod implements various logical router ports depending on the number of logical routers that it implements and the number of logical services for each of those logical routers. In some embodiments, the datapath 945 receives data messages on one or more separate logical router ports for each logical router that the L4 Pod 900 implements. Specifically, in some embodiments, the datapath 945 implements a southbound logical router port (i.e., facing the logical network) as well as a northbound uplink port (i.e., facing a T0 logical router and/or the external network, by reference to FIG. 3). Incoming data traffic (sent via the T0 logical router from either the external network or a different T1 logical router) is received by the datapath at the uplink port, whereas outgoing data traffic (sent to the T1 logical router from a logical network endpoint underneath that logical router) is received at the southbound logical router port. As mentioned, because the datapath 945 may implement multiple logical routers, some embodiments include a southbound port and one or more uplink ports for each such logical router.

In addition, the datapath 945 implements at least one separate service port for each logical router that includes L7 services. In some embodiments, the logical router is defined to include a separate service port for each L7 service (assuming those services are implemented by different L7 Pods). In other embodiments, the logical router is defined with a single service port for all L7 services. In the former case, if a particular service is load balanced between multiple L7 Pods, some embodiments define separate service ports for each of the L7 Pods. In other embodiments, because the service ports are defined by the network management system while the number of L7 Pods for a given service is determined by the L4 Pod (e.g., based on current load), one service port is used for each L7 service irrespective of the number of L7 Pods implementing a given service.

In some embodiments, each logical router service port implemented by the datapath 900 is linked with one or more of the L4 Pod ports. For instance, if the two L7 Pods 905 and 910 perform services for two different logical routers, then a different logical router service port is linked with the two ports eth1 and eth2 of the L4 Pod 900. If the two L7 Pods 905 and 910 perform the same service for the same logical router, some embodiments associate a single logical router service port with each of the two L4 Pod ports (with a load balancing decision by the datapath determining to which Pod port a given data message is sent).

As noted, the L2 constructs between the L4 Pod and the L7 Pods (e.g., the L2 construct 565 in FIG. 5) may vary between different implementations (e.g., depending on the type of datacenter in which the Kubernetes cluster is hosted). In this example, the nodes 915 and 920 are virtual machines that execute on a hypervisor of the same host computer (e.g., an ESX host). Thus, the constructs used to connect the L4 Pod 900 to the L7 Pod 905 on the same node 915 remain internal to the node. Specifically, an OVS bridge 950 (e.g., a type of virtual switching element) is used, to which eth1 of the L4 Pod 900 and veth1 of the L7 Pod 905 both attach. Data messages can be sent from the L4 Pod 900 to the L7 Pod 905 via this bridge 950 by encapsulating the data message using the MAC and/or IP address of veth1 as the outer destination address in some embodiments. Similarly, these data messages can be returned to the L4 Pod 900 via the bridge 950 by the L7 Pod 905 encapsulating the data message using the MAC and/or IP address of eth 1 as the outer destination address. The OVS bridge 950 (as well as other OVS bridges on the node 915 for connecting the L4 Pod 900) are configured by a network container plugin agent, in some embodiments. In some such embodiments, the network management system that provides configuration for the logical routers also provides configuration for the inter-Pod networking.

The second port of the L4 Pod 900 (eth2) connects to a separate OVS bridge 955 for carrying data traffic to the L7 Pod 910 on the other node 920. In this case, the bridge 955 includes a tunnel port. A corresponding bridge 960 with a tunnel port is defined on the second node 920, to which the L7 Pod 910 connects. These tunnel ports are linked to virtual tunnel endpoints (VTEPs) of the nodes 915 and 920 that connect to a virtual switch 965 executing on the node (e.g., in the hypervisor of the node). Thus, a data message sent from the L4 Pod 900 to the L7 Pod 910 on the second node 920 is initially sent to the OVS bridge 955 using the L7 Pod 910 as a destination address for encapsulation. In some embodiments, the OVS bridge 955 forwards the data message to its tunnel port based on this destination address. Some embodiments apply a second encapsulation using the tunnel port of the OVS bridge 960 on the second node 920 as the outer destination address, such that the virtual switch 965 directs the data message to the OVS bridge 960. This bridge then delivers the data message to the L7 Pod 910.

Figure 10:
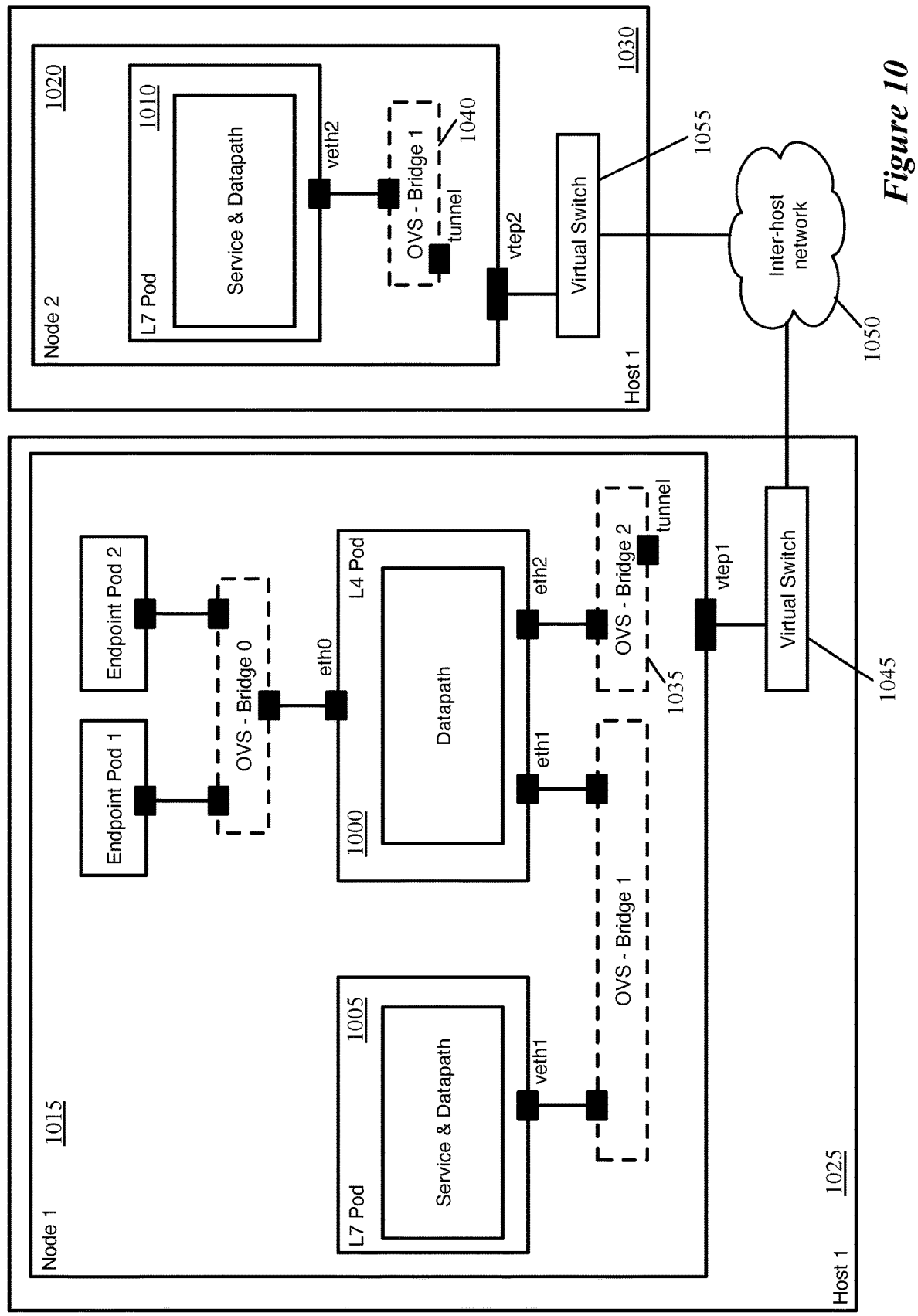

FIG. 10 conceptually illustrates a similar situation to FIG. 9 but with one of the L7 Pods operating on a separate host computer from the L4 Pod 1000. That is, the L4 Pod 1000 executes on the same node 1015 as one L7 Pod 1005 on a first host computer 1025, with the L2 constructs connecting these Pods the same as in FIG. 9. However, the second L7 Pod 1010 executes on a separate node 1020 that operates on a second, different host computer 1030. In this case, for the L4 Pod 1000 to send a data message to the second L7 Pod 1005, the data message is initially sent to the OVS bridge 1035 and forwarded via the tunnel port to the corresponding tunnel port on an OVS bridge 1040 on the second node 1020. This tunnel requires the data message being sent via the virtual switch 1045 on the first host 1025 and then through the inter-host network 1050 (e.g., a datacenter network) to the virtual switch 1055 on the second host computer 1030. In some embodiments, this involves a third layer of encapsulation between the two host computers 1025 and 1030. From the virtual switch 1055, the data message proceeds as in the same-host example, via the bridge 1040 to the L7 Pod 1010.

Figure 11:
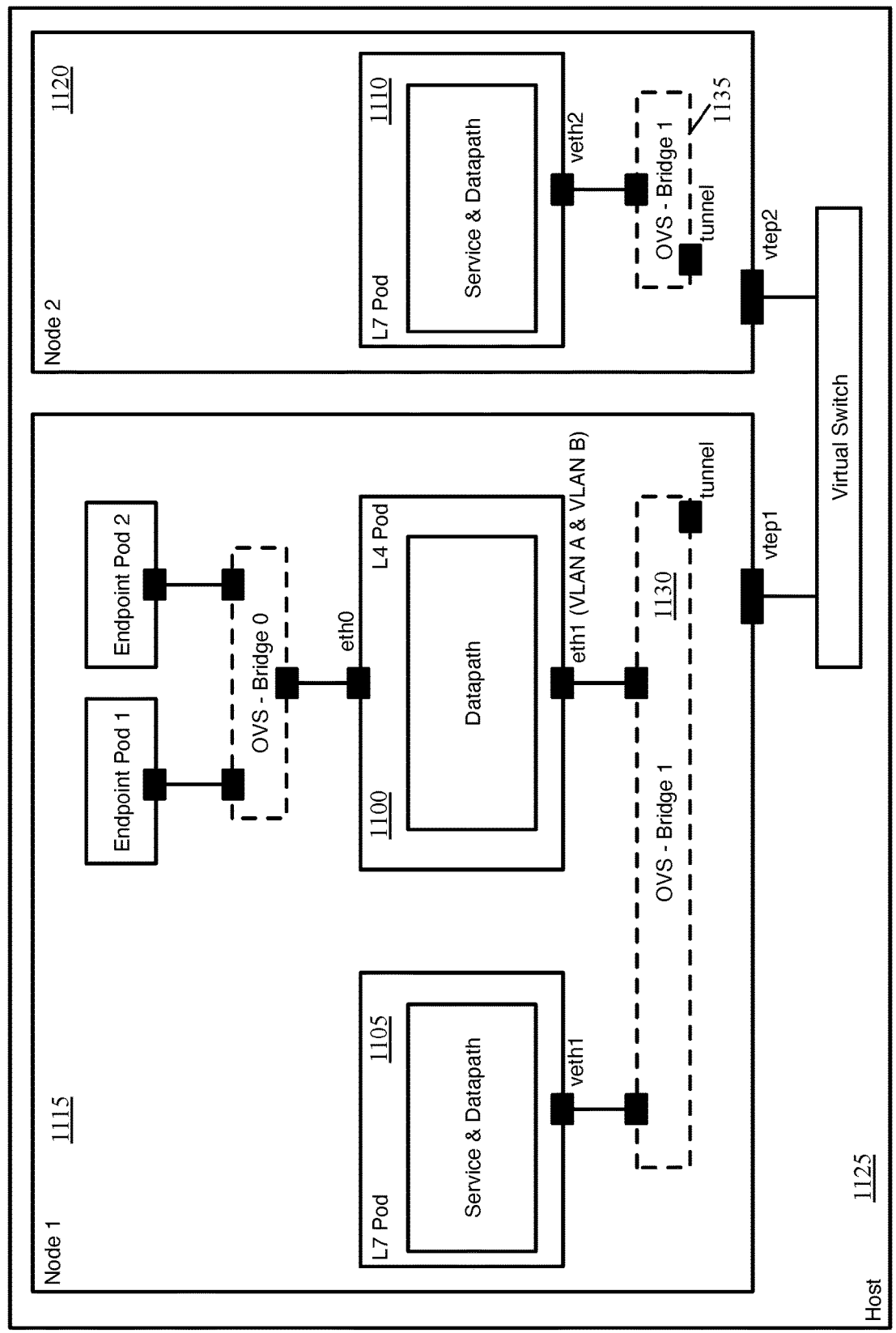

As stated, in some embodiments the L4 Pod is configured with a single port for connection to all of the L7 Pods for its logical routers. FIG. 11 conceptually illustrates an example similar to FIG. 9 but with a single port on the L4 Pod 1100 for connection to multiple L7 Pods 1105 and 1110, one of which executes on the same node 1115 as the L4 Pod 1100 and one of which executes on a different node 1120 (but on the same host computer 1125). In this case, the eth1 port of the L4 Pod 1100 connects to an OVS bridge 1130, which both (i) includes a port to which the L7 Pod 1105 on the same node 1115 connects (via its veth1 port) and (ii) includes a tunnel port for tunneling data messages to the OVS bridge 1135 to which the L7 Pod 1110 on the second node 1120 connects. To differentiate data traffic that should be sent to (and from) the different L7 Pods 1105 and 1110, some embodiments use different VLAN tags for this traffic. That is, data messages for the first L7 Pod 1105 include a first VLAN tag while data messages for the second L7 Pod 1110 include a second VLAN tag, but are sent from the same interface (eth1). These may be referred to as enabling different sub-interfaces on the eth1 interface. In some embodiments, this enables traffic to be sent via one port to up to 4096 interfaces (the number of available VLAN tags).

Figure 12:
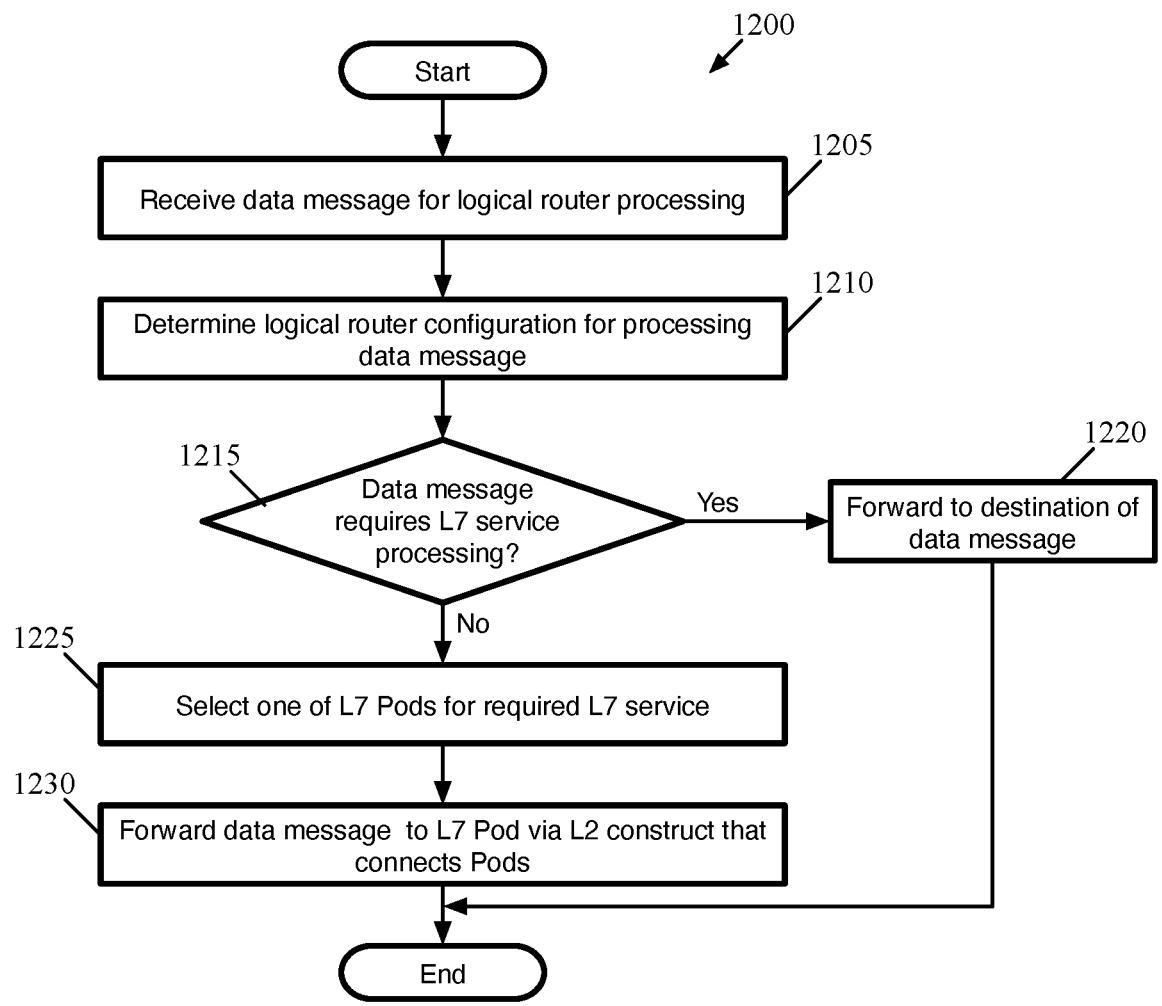
FIG. 12 conceptually illustrates a process of some embodiments for sending a data message from an L4 Pod to an L7 Pod.

When a given service is implemented by multiple L7 Pods, in some embodiments the datapath executing on the L4 Pod is responsible for load balancing between the Pods. The datapath selects one of the L7 Pods and sends the data message to the selected L7 Pod via the L2 constructs (which are generally transparent to the datapath). FIG. 12 conceptually illustrates a process 1200 of some embodiments for sending a data message from an L4 Pod to an L7 Pod. The process 1200, in some embodiments, is performed by the datapath (e.g., a DPDK datapath thread) executing on the L4 Pod that implements logical forwarding operations for one or more logical routers.

As shown, the process 1200 receives (at 1205) a data message for logical router processing. The datapath receives the data message via a specific physical interface of the L4 Pod. In some embodiments, this may be a specific interface configured for exchanging data traffic with one or more L7 Pods, an interface for other inter-pod traffic, etc.

The process 1200 then determines (at 1210) which logical router configuration to use for processing the received data message. In some embodiments, the data message is encapsulated for transmission to the L4 Pod and this encapsulation indicates a specific logical router port (which thus identifies a specific logical router). The data message may be received at the uplink port of a logical router (e.g., for incoming data messages sent from an external network to the logical network), the downlink port (e.g., for outgoing data messages sent from the logical network to the external network), or a service port (e.g., for data messages being returned from an L7 service). In some embodiments, the datapath implements a T0 logical router and one or more T1 logical routers, in which case for incoming data messages the T0 logical router processing is performed first and determines which T1 logical router processing should be performed next. In some embodiments, the datapath uses different VRFs for different logical routers.

In performing the processing for the identified logical router, the process 1200 determines (at 1215) whether the data message requires L7 service processing. In some embodiments, policy-based routing is used to route data messages to L7 Pods until all of the configured L7 services have been performed on a data message. That is, in some embodiments, the L4 Pod tracks which L7 services have been performed on each data message (e.g., by storing state, either locally or in encapsulation headers of the data messages) and routes data messages based on this state in addition to the routing rules.

If the data message does not require any L7 service processing, either because the data message does not match any rules that specify that it should have L7 services applied or because all necessary L7 service processing has been applied to the data message, the process 1200 forwards (at 1220) the data message to its destination. In some embodiments, the datapath sends the data message out the standard (e.g., eth0) interface of the L4 Pod in this case.

On the other hand, if the data message requires processing by a particular L7 service, the process 1200 selects (at 1225) one of the L7 Pods that implements the particular L7 service. If only a single L7 Pod is instantiated for the service, then no load balancing is needed. However, if more than one L7 Pod is instantiated in the cluster for the required L7 service, then the datapath balances traffic across these Pods. In some embodiments, each data flow processed by the datapath for a logical router is assigned to one of the L7 Pods, such that all of the data messages for a given data message flow are sent to the same L7 Pod. The datapath stores connection tracking state to keep track of these data message flows in some embodiments or uses a deterministic algorithm such as a hash of invariant header fields of the data message flow (e.g., the connection 5-tuple of source/destination IP address, source/destination transport layer port number, and transport protocol) so that the same L7 Pod is selected for each data message in a flow. Some embodiments regularly assess the load on each of the L7 Pods (e.g., based on reported data or estimated based on the number of connections sent to each Pod) and use these assessments to attempt to balance traffic evenly between the multiple L7 Pods for a service.

Finally, the process 1200 forwards (at 1225) the data message to the L7 Pod via the L2 construct(s) that connects the L4 Pod to the L7 Pod. As described above, in some embodiments the datapath encapsulates the data message using the interface attributes of the selected L7 Pod then forwards the data message out of the L4 Pod interface (or sub-interface enabled by applying a VLAN tag) created for connection to the selected L7 Pod. The L2 constructs, in some embodiments, are transparent to the datapath, but can include those described above by reference to FIGS. 9-11.

Figure 13:
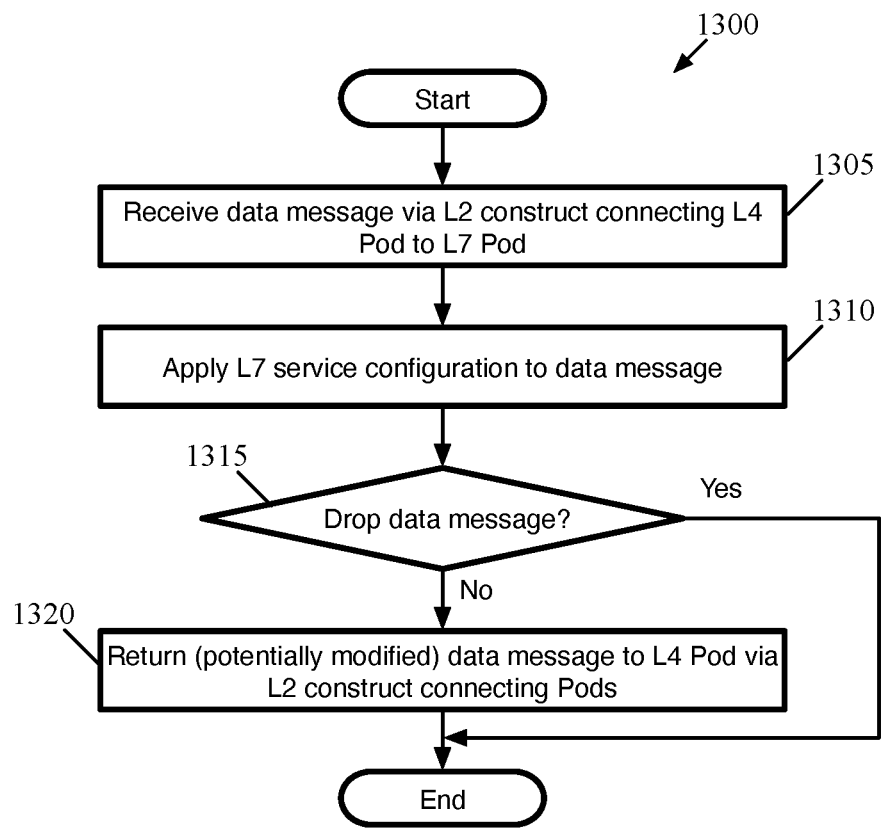
FIG. 13 conceptually illustrates a process of some embodiments for applying an L7 service to a data message sent from an L4 Pod FIG. 14 conceptually illustrates an electronic system with which some embodiments of the invention are implemented.

FIG. 13 conceptually illustrates a process 1300 of some embodiments for applying an L7 service to a data message sent from an L4 Pod. The process 1300 is performed, in some embodiments, by the L7 Pod to which a data message is sent by the L4 Pod (e.g., a datapath and/or set of service modules executing on the L7 Pod).

As shown, the process 1300 begins by receiving (at 1305) a data message via an L2 construct (or set of L2 constructs) that connect the L4 Pod for a logical router to the L7 Pod performing a service for that logical router. The L2 constructs, in some embodiments, are transparent to the L7 Pod, but can include those described above by reference to FIGS. 9-11.

The process 1300 then applies (at 1310) its L7 service configuration to the received data message. This service, in some embodiments, may be L7 firewall service, a TLS service (e.g., TLS proxy), L7 load balancing service (e.g., load balancing based on information in the application header), URL filtering, and/or DNS forwarding.

The process 1300 then determines (at 1315) whether the result of performing the L7 service is to drop the data message. Certain services (e.g., L7 firewall, URL filtering, etc.) block certain data messages based on the content of the L7 header (e.g., to prevent certain types of traffic or certain content) from entering the logical network). In this case, if the data message is dropped, the process 1300 ends.

On the other hand, if the data message is not dropped, then the process returns (at 1320) the data message (which may have been modified by the L7 service processing) to the L4 Pod via the L2 construct(s) that connects the L4 Pod to the L7 Pod. As described above, in some embodiments the L7 Pod encapsulates the data message using the interface attributes of the L4 Pod (possibly including a VLAN tag) and then forwards the data message out of the L7 Pod interface created for connection to the L4 Pod. The L2 constructs, in some embodiments, are transparent to the L7 Pod, but can include those described above by reference to FIGS. 9-11.

Figure 14:
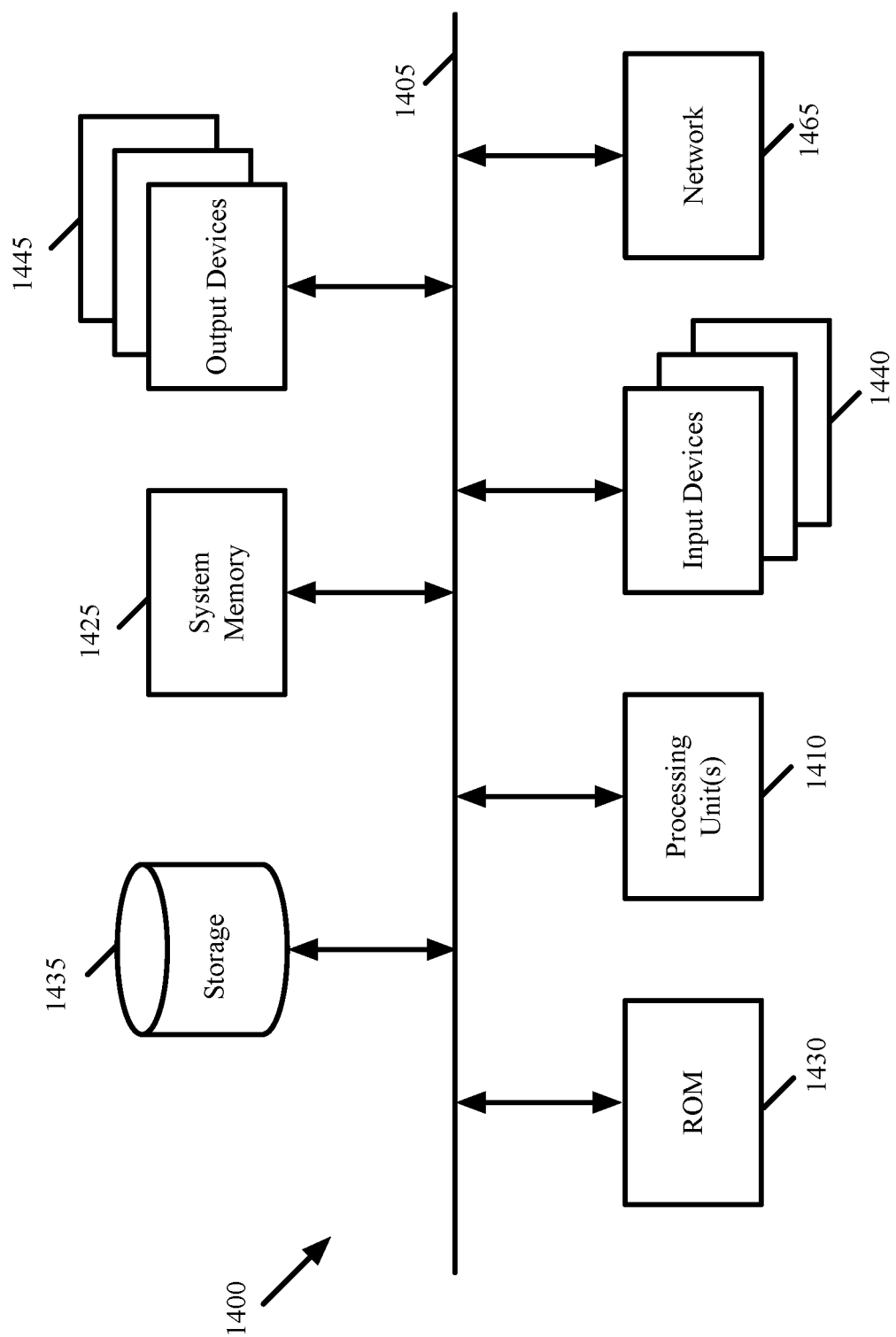

FIG. 14 conceptually illustrates an electronic system 1400 with which some embodiments of the invention are implemented. The electronic system 1400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the system memory 1425, and the permanent storage device 1435.

From these various memory units, the processing unit(s) 1410 retrieve instructions to execute and data to process in order to execute the processes of the invention. The processing unit(s) may be a single processor or a multi-core processor in different embodiments.

The read-only-memory (ROM) 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1425 is a read-and-write memory device. However, unlike storage device 1435, the system memory is a volatile read-and-write memory, such a random-access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the electronic system. The input devices 1440 include alphanumeric keyboards and pointing devices (also called "cursor control devices"). The output devices 1445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples electronic system 1400 to a network 1465 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 7, 8, 12 and 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for implementing a logical router of a logical network, the method comprising:
    at a first Pod executing on a first node of a Kubernetes cluster to implement data message forwarding for the logical router:
    receiving a data message for processing by the logical router;
    determining that the data message requires layer 7 (L7) service processing at the logical router;
    selecting a second Pod from a plurality of Pods that perform L7 service for the logical router, each Pod of the plurality of Pods executing on a different node of the cluster;
    retrieving a security key specific to a type of L7 security service implemented by the second Pod, the security key being selected from a set of pre-defined keys based on a service configuration;
    providing datapath interface attributes to the second Pod using a Kubernetes ConfigMap, the datapath interface attributes including a MAC address, VLAN identifier, and IP address for configuring a second interface on the second Pod for L2 communication with the first Pod; and
    forwarding the data message to the second Pod via a layer 2 (L2) construct that connects the first and second Pods.

2. The method of claim 1, wherein the second Pod executes on the first node along with the first Pod.

3. The method of claim 1, wherein the second Pod executes on a second, different node than the first Pod.

4. The method of claim 3, wherein one of the other Pods that performs L7 service processing for the logical router executes on the first Pod.

5. The method of claim 1, wherein selecting the second Pod from the plurality of Pods comprises performing a load balancing operation to select the second Pod.

6. The method of claim 1 further comprising:
    receiving the data message back from the second Pod after the second Pod performs the L7 service on the data message, and
    forwarding the processed data message to a destination of the data message.

7. The method of claim 1, wherein the L2 construct that connects the first and second Pods comprises a virtual switch executing on the first node.

8. The method of claim 7, wherein the virtual switch is an Open vSwitch (OVS) bridge.

9. The method of claim 7, wherein:
    the second Pod also executes on the first node; and
    the first and second Pods both have ports connected to the virtual switch.

10. The method of claim 7, wherein:
    the virtual switch is a first virtual switch;
    the second Pod executes on a second, different node; and
    the L2 construct further comprises a second virtual switch executing on the second node and a tunnel between the first and second virtual switches.

11. The method of claim 7, wherein the first Pod comprises separate interfaces connected to the virtual switch for connections to each of the plurality of Pods.

12. The method of claim 7, wherein the first Pod comprises a single interface connected to the virtual switch for connections to all of the Pods in the plurality of Pods.

13. The method of claim 12, wherein traffic for each of the Pods in the plurality of Pods uses a different sub-interface enabled by a different VLAN tag.

14. The method of claim 1, wherein:
    the data message is a first data message and the plurality of Pods is a first plurality of Pods;
    the first Pod implements data message forwarding for a plurality of logical routers of the logical network; and
    the method further comprises:
    receiving a second data message for processing by a second logical router;

determining that the second data message requires layer 7 (L7) service processing at the second logical router;

selecting a third Pod from a second plurality of Pods that perform an L7 service for the second logical router, each Pod of the second plurality of Pods executing on a different node of the cluster; and forwarding the second data message to the third Pod via a layer 2 (L2) construct that connects the first and third Pods.

15. The method of claim 14, wherein the L2 construct that connects the first and second Pods is the same as the L2 construct that connects the first and third Pods.

16. The method of claim 1, wherein:

the plurality of Pods is a first plurality of Pods that perform a first L7 service for the logical router; and a second plurality of Pods performs a second L7 service for the logical router.

17. A non-transitory machine-readable medium storing a program which when executed by at least one processing unit implements a logical router of a logical network, the program executing in a first Pod that executes on a first node of a Kubernetes cluster to implement data message forwarding for the logical router:

receiving a data message for processing by the logical router;

determining that the data message requires layer 7 (L7) service processing at the logical router;

selecting a second Pod from a plurality of Pods that perform L7 service for the logical router, each Pod of the plurality of Pods executing on a different node of the cluster;

retrieving a security key specific to a type of L7 security service implemented by the second Pod, the security key being selected from a set of pre-defined keys based on a service configuration;

providing datapath interface attributes to the second Pod using a Kubernetes ConfigMap, the datapath interface attributes including a MAC address, VLAN identifier, and IP address for configuring a second interface on the second Pod for L2 communication with the first Pod; and forwarding the data message to the second Pod via a layer 2 (L2) construct that connects the first and second Pods.

18. The non-transitory machine-readable medium of claim 17, wherein the set of instructions for selecting the second Pod from the plurality of Pods comprises a set of instructions for performing a load balancing operation to select the second Pod.

19. The non-transitory machine-readable medium of claim 17, wherein the program further comprises sets of instructions for:

receiving the data message back from the second Pod after the second Pod performs the L7 service on the data message, and forwarding the processed data message to a destination of the data message.

20. The non-transitory machine-readable medium of claim 17, wherein:

the second Pod also executes on the first node;

the L2 construct that connects the first and second Pods comprises a virtual switch executing on the first node; and the first and second Pods both have ports connected to the virtual switch.

21. The non-transitory machine-readable medium of claim 17, wherein:

the second Pod executes on a second, different node; and the L2 construct that connects the first and second Pods comprises a first virtual switch executing on the first node, a second virtual switch executing on the second node, and a tunnel between the first and second virtual switches.

22. The non-transitory machine-readable medium of claim 17, wherein:

the L2 construct that connects the first and second Pods comprises a virtual switch executing on the first node; and the first Pod comprises separate interfaces connected to the virtual switch for connections to each of the plurality of Pods.

23. The non-transitory machine-readable medium of claim 17, wherein:

the L2 construct that connects the first and second Pods comprises a virtual switch executing on the first node;

the first Pod comprises a single interface connected to the virtual switch for connections to all of the Pods in the plurality of Pods; and traffic for each of the Pods in the plurality of Pods uses a different sub-interface enabled by a different VLAN tag.

24. The non-transitory machine-readable medium of claim 17, wherein:

the plurality of Pods is a first plurality of Pods that perform a first L7 service for the logical router; and a second plurality of Pods performs a second L7 service for the logical router.

* * * * *